(12) United States Patent
Roemer et al.

(10) Patent No.: US 10,256,452 B2
(45) Date of Patent: Apr. 9, 2019

(54) CELL CONTACTING SYSTEM FOR AN ELECTRO-CHEMICAL DEVICE AND METHOD FOR PRODUCING A CELL CONTACTING SYSTEM

(71) Applicant: ElringKlinger AG, Dettingen (DE)

(72) Inventors: Ruben Roemer, Reutlingen (DE); Udo Hoenle, Rottenburg (DE); Stefan Kazmaier, Kirchheim unter Teck (DE); Wolfgang Fritz, Metzingen (DE)

(73) Assignee: ElringKlinger AG, Dettingen (DE)

( * ) Notice: Subject to any disclaimer, the term of this patent is extended or adjusted under 35 U.S.C. 154(b) by 79 days.

(21) Appl. No.: 15/411,692

(22) Filed: Jan. 20, 2017

(65) Prior Publication Data

US 2017/0133656 A1 May 11, 2017

Related U.S. Application Data

(63) Continuation of application No. PCT/EP2015/066044, filed on Jul. 14, 2015.

(30) Foreign Application Priority Data

Jul. 21, 2014 (DE) .................... 10 2014 110 211

(51) Int. Cl.
*H01M 2/20* (2006.01)
*H01M 2/10* (2006.01)
(Continued)

(52) U.S. Cl.
CPC ............... *H01M 2/206* (2013.01); *C25B 9/04* (2013.01); *H01M 2/1077* (2013.01);
(Continued)

(58) Field of Classification Search
CPC ........................................................ H01M 2/20
See application file for complete search history.

(56) References Cited

U.S. PATENT DOCUMENTS

| | | | |
|---|---|---|---|
| 2012/0164509 A1* | 6/2012 | Ogasawara | ............ H01R 9/226 429/121 |
| 2015/0125727 A1 | 5/2015 | Lui et al. | |
| 2016/0197330 A1 | 7/2016 | Takase et al. | |

FOREIGN PATENT DOCUMENTS

| | | |
|---|---|---|
| DE | 10 2012 205 909 | 10/2013 |
| EP | 2 849 252 | 3/2015 |
| EP | 2 876 704 | 5/2015 |

* cited by examiner

*Primary Examiner* — Jacob B Marks
(74) *Attorney, Agent, or Firm* — Womble Bond Dickinson (US) LLP

(57) ABSTRACT

A cell contacting system for an electro-chemical device includes a plurality of electro-chemical cells and a current line system, wherein the cell contacting system includes a signal line system having signal lines for connecting a respective signal source to a signal line termination or to a monitoring device of the cell contacting system and a carrier element which carries the signal line system. The cell contacting system further includes at least one signal-line-system-side positioning element which is fixed to a signal line of the signal line system and at least one carrier-element-side positioning element which is fixed at least temporarily to the carrier element, wherein the signal-line-system-side positioning element is connected to the carrier-element-side positioning element at least temporarily in such a way that the signal-line-system-side positioning element is positioned in a desired position relative to a cell connector or a current termination of the current line system.

20 Claims, 17 Drawing Sheets

(51) Int. Cl.
*H01M 10/48* (2006.01)
*H01R 9/16* (2006.01)
*C25B 9/04* (2006.01)
*H01M 10/42* (2006.01)
*H01R 25/16* (2006.01)

(52) U.S. Cl.
CPC ....... *H01M 10/425* (2013.01); *H01M 10/482* (2013.01); *H01M 10/486* (2013.01); *H01R 9/16* (2013.01); *H01R 25/162* (2013.01); *H01M 2010/4278* (2013.01)

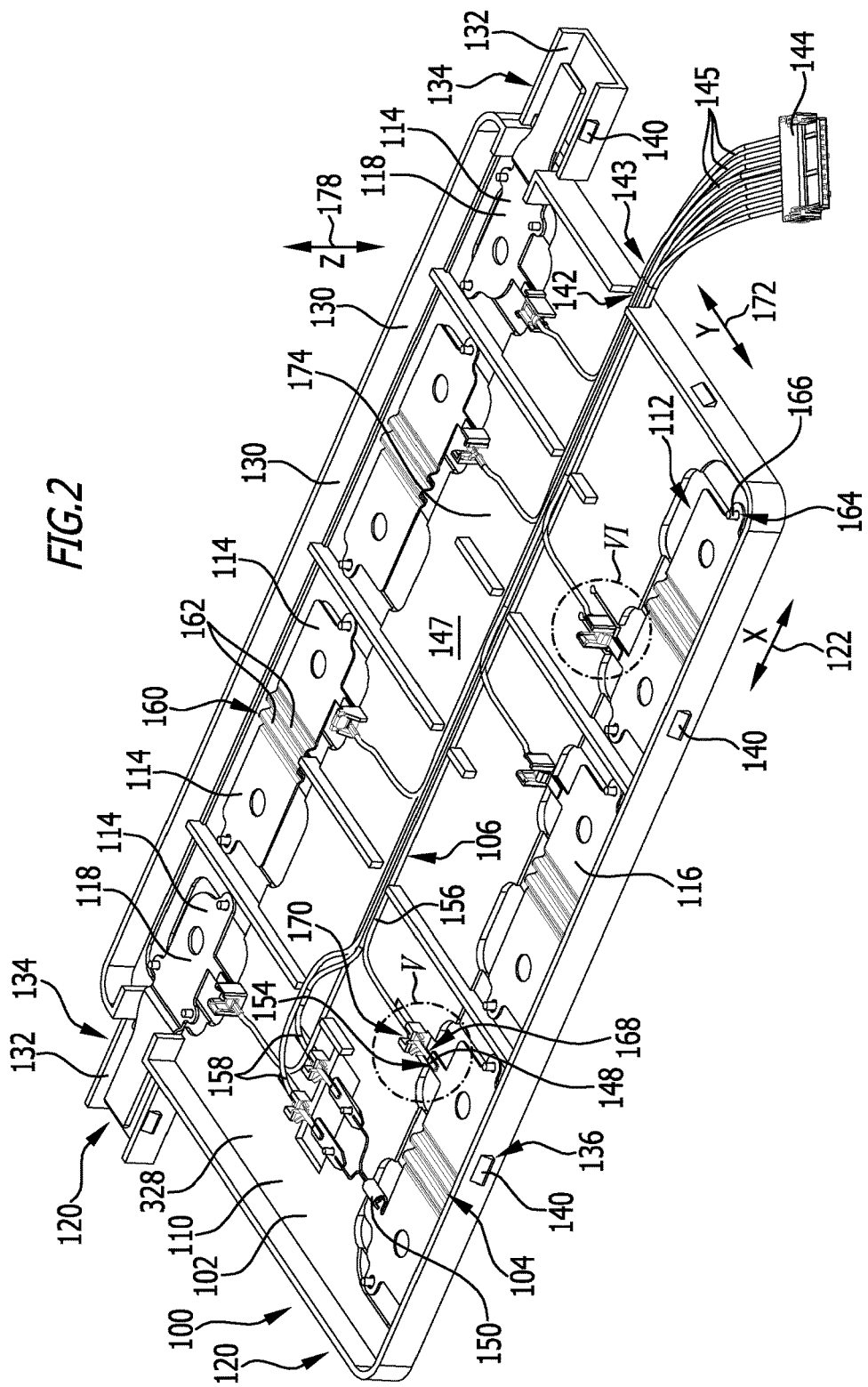

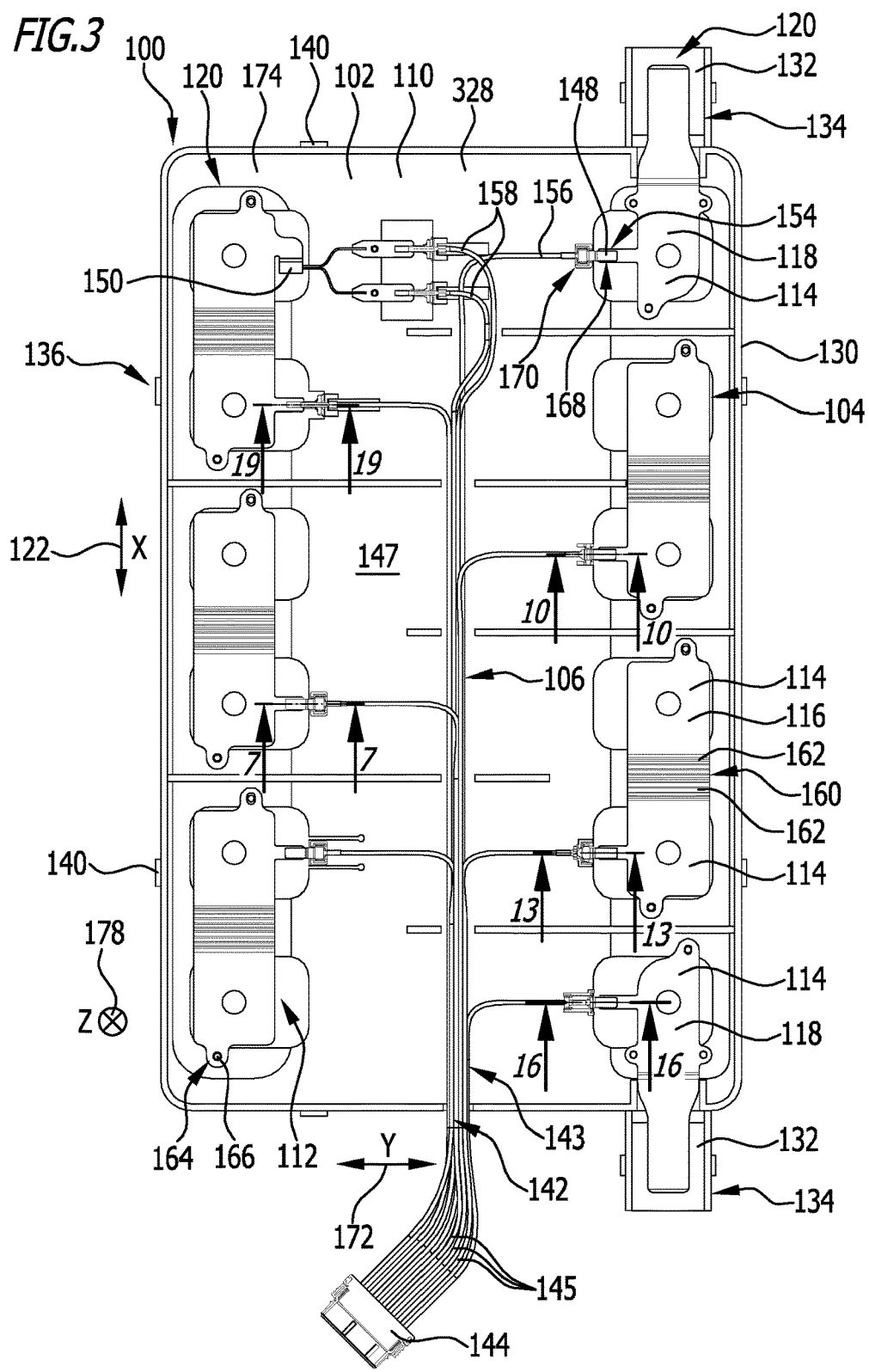

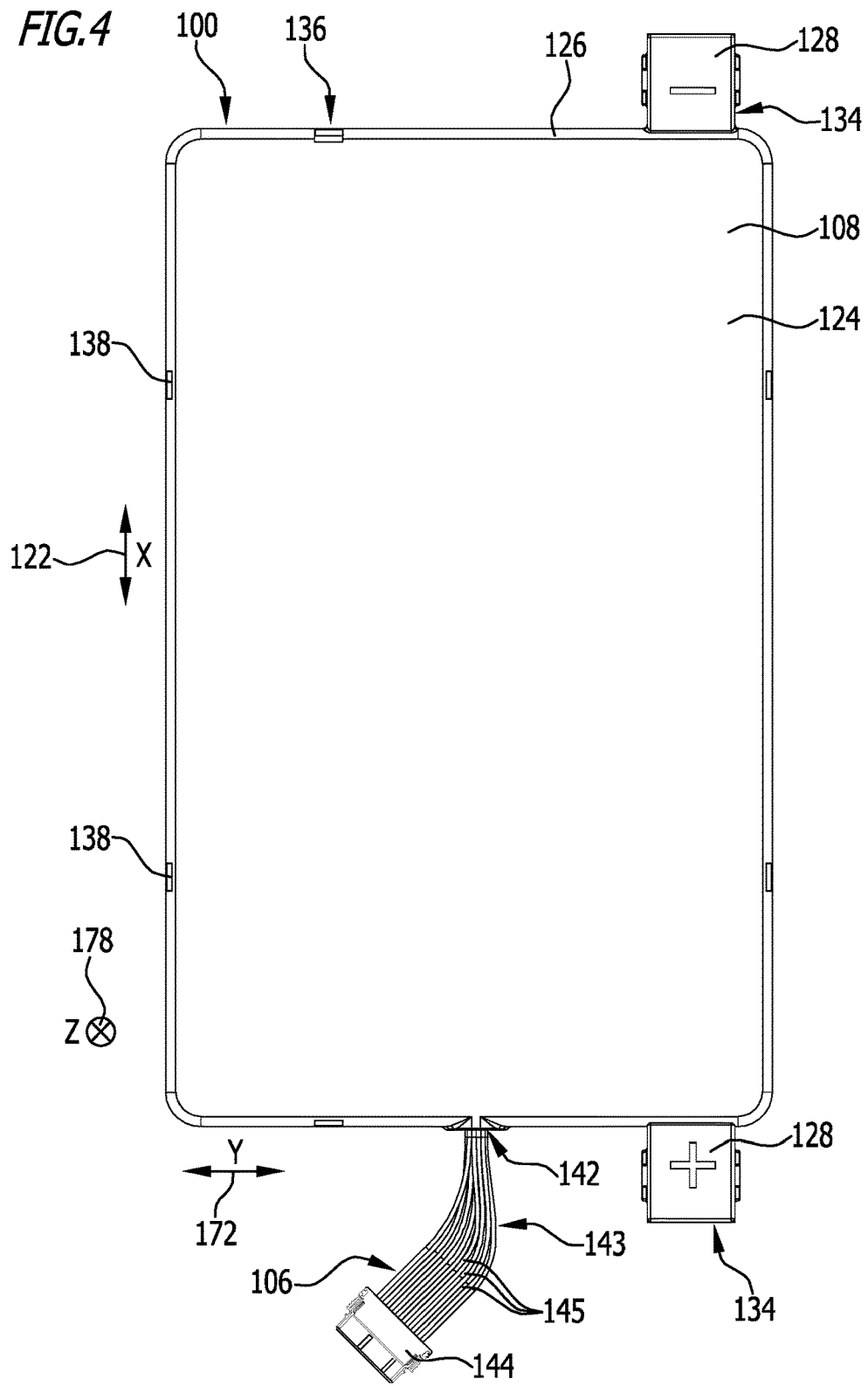

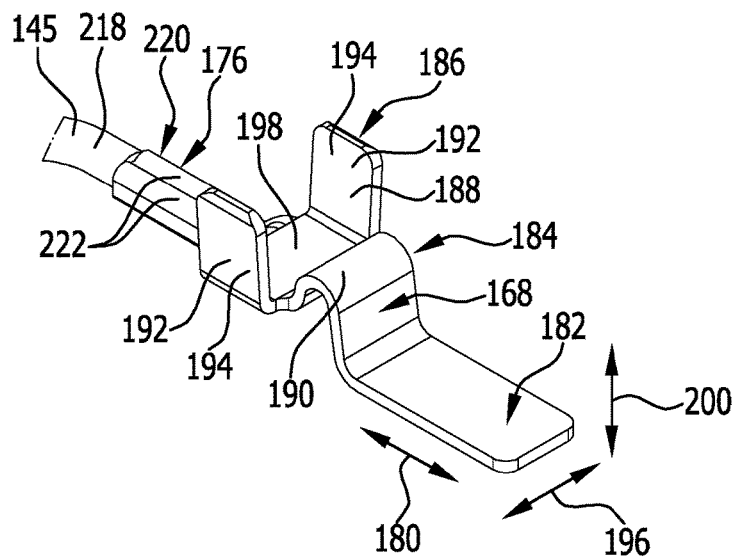
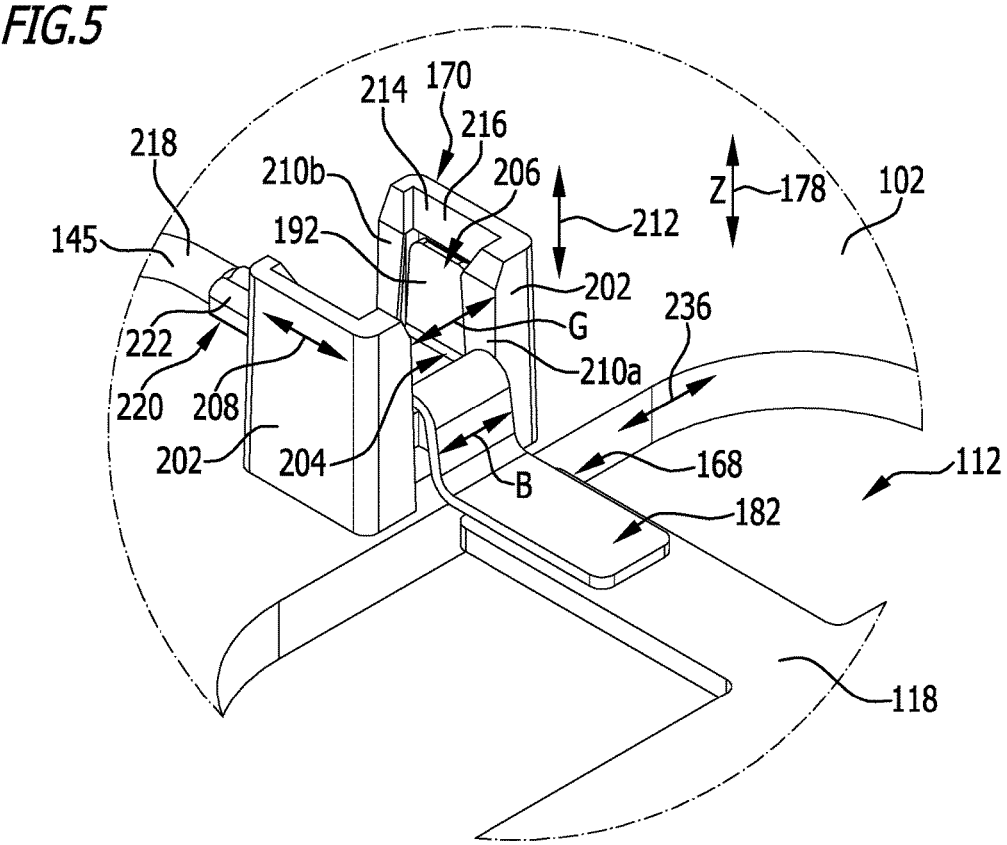

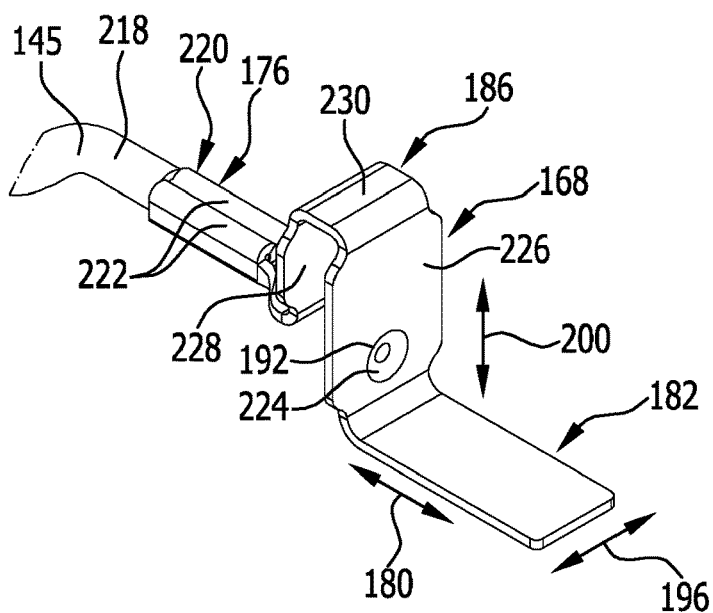
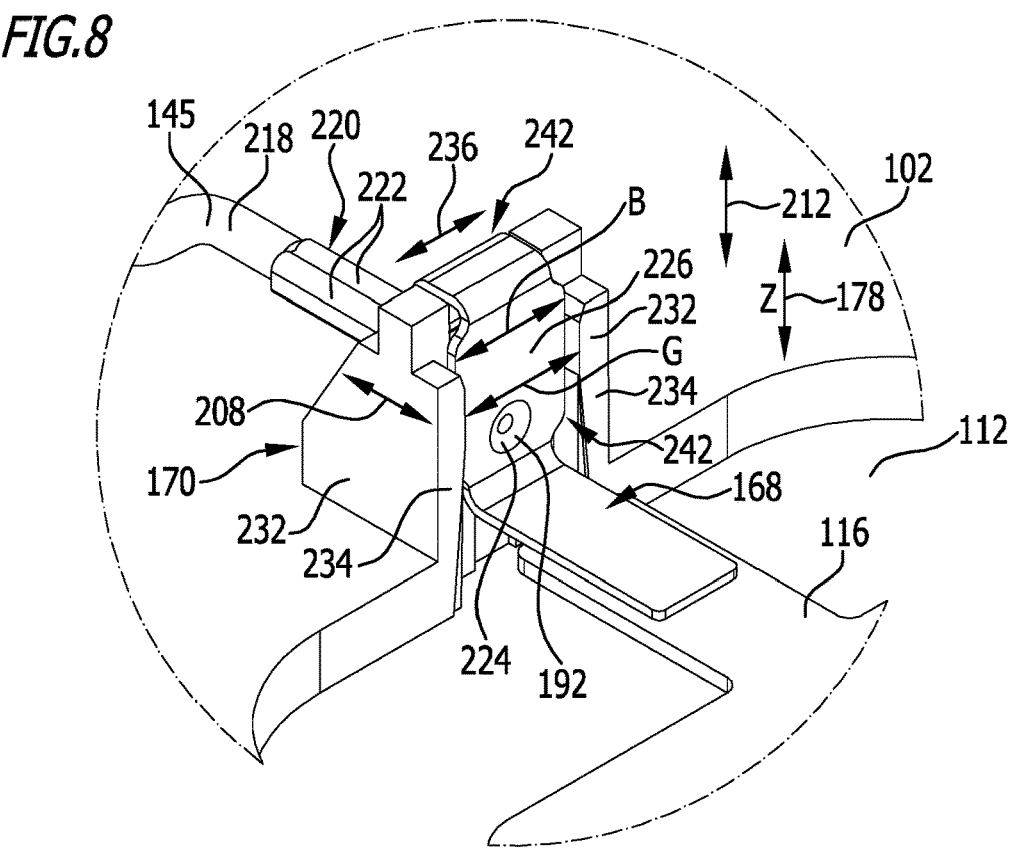

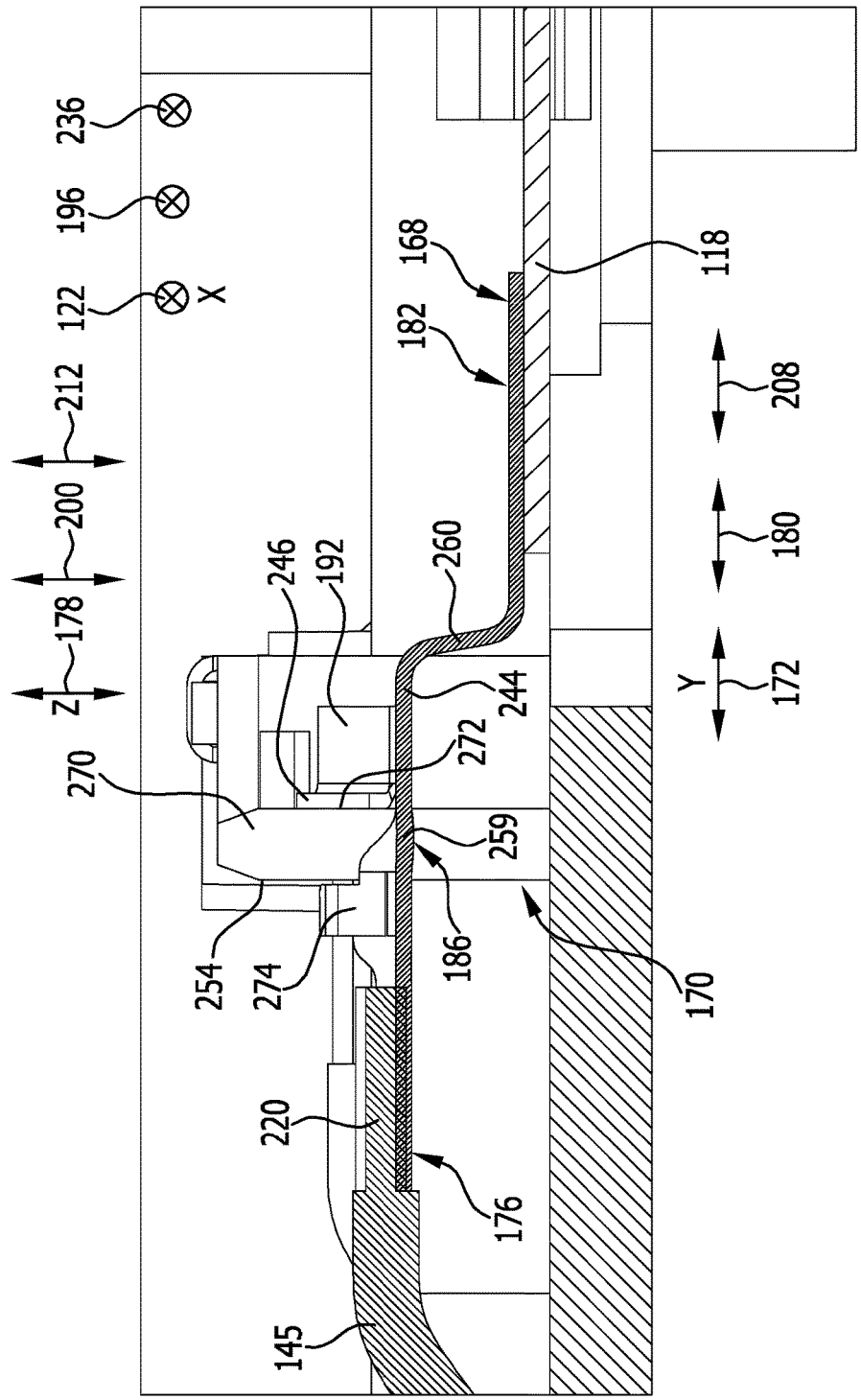

CELL CONTACTING SYSTEM FOR AN ELECTRO-CHEMICAL DEVICE AND METHOD FOR PRODUCING A CELL CONTACTING SYSTEM

RELATED APPLICATIONS

This application is a continuation application of PCT/EP2015/066044, filed on Jul. 14, 2015, which claims priority to German Pat. App. No. 10 2014 110 211.8, filed on Jul. 21, 2014, both of which are incorporated herein by reference in their entireties.

FIELD OF DISCLOSURE

The present invention relates to a cell contacting system for an electro-chemical device which comprises a plurality of electro-chemical cells and a current line system, wherein the cell contacting system comprises a signal line system having a plurality of signal lines for connecting a respective signal source to a signal line termination or to a monitoring device of the cell contacting system in electrically conductive manner and a carrier element which carries the signal line system.

BACKGROUND

Such a cell contacting system serves the purpose of enabling an individual cell to be monitored in regard to physical measured variables such as the voltage and the temperature for example by means of the signal line system. To this end for example, potential differences between different cell connectors are measured and/or temperatures in the proximity of the cell connectors are detected by means of suitable temperature sensors. The signal sources or measuring points are connected by the signal line system in electrically conductive manner to the signal line termination which serves as an interface to a monitoring device of the electro-chemical device or to a monitoring device which is integrated into the electro-chemical device.

In the case of known cell contacting systems, the signal line system comprises a wiring harness which serves for tapping-off the voltage and forms an electrical connection from the cell connectors to the signal line termination. This wiring harness is usually pre-mounted in a carrier of plastics material for ease of handling. The cable ends are stripped and can be covered with a welding aid. These cable ends are welded to the respectively associated cell connector in an assembly plant by means of an ultrasonic welding process for example. In order to enable such a welding process to be carried out fully automatically, it is necessary for the cable end to be located at a defined position relative to the respectively associated cell connector so as to ensure that the cable end is located exactly between the anvil and the sonotrode during the welding process.

The problem arising here is that the cable ends have a relatively low flexural rigidity and thus tend to depart from the ideal welding position before the welding process due, for example, to being shaken during transport.

Consequently, when using such an approach, it is necessary to align the cable ends relative to a carrier element of the cell contacting system during the assembly process and to check and if necessary repeat this alignment process before the welding process.

The protruding cable ends of the wiring harness cannot be held in the ideal welding position for ensuring proper processing during the entire period of transport, pre-assembly and final assembly. The cables are flexible and are thus not able to maintain a given positional tolerance to a sufficiently precise extent for the connecting steps and processes following on a positioning process. Checking and alignment steps are therefore required. Cycle times are thereby extended, which entails an increase in cost.

SUMMARY OF THE INVENTION

The object of the present invention is to provide a cell contacting system of the type mentioned hereinabove with which an electrically conductive connection between the signal line system and the cell connectors and/or current terminations of the current line system is producible in a particularly simple and reliable manner without the need, insofar as possible, for checking and correcting steps after a positioning process.

In accordance with the invention, this object is achieved in the case of a cell contacting system incorporating the features mentioned in the preamble of Claim 1 in that the cell contacting system comprises at least one signal-line-system-side positioning element which is fixed to a signal line of the signal line system and at least one carrier-element-side positioning element which is fixed at least temporarily to the carrier element, wherein the signal-line-system-side positioning element is connected at least temporarily to the carrier-element-side positioning element in such a way that the signal-line-system-side positioning element is positioned in a desired position relative to a cell connector or a current termination of the current line system.

The concept underlying the solution in accordance with the invention is that of realizing the electrically conductive connection between the current line system and the signal line system by means of an additional signal-line-system-side positioning element which is fixed to at least one signal line of the signal line system on the one hand and is connected in electrically conductive manner to a cell connector or to a current termination of the current line system on the other.

The signal-line-system-side positioning element can thereby cooperate with a respectively associated carrier-element-side positioning element in such a way that the signal-line-system-side positioning element is positioned in a desired position relative to a cell connector or a current termination of the current line system by means of the carrier-element-side positioning element and is fixable in this desired position to the cell connector or to the current termination, preferably by means of a substance-to-substance bond and in particular by means of welding such as by ultrasonic welding for example.

The process of assembling the cell contacting system in accordance with the invention is thereby made considerably easier.

The current line system comprises one or more cell connectors for connecting the cell poles of different electro-chemical cells in electrically conductive manner.

The current line system enables a power current to flow from and to the electro-chemical cells of the electro-chemical device.

A cell connector of the current line system can be any type of one-piece or composite current conveying element which, during the operation of the electro-chemical device, connects the cell poles of different electro-chemical cells to one another in an electrically conductive manner.

Such a cell connector can, for example, be formed from cell terminals of the electro-chemical cells that are connected to one another in an electrically conductive manner.

As an alternative thereto, provision could also be made for such a cell connector to be an element which is provided in addition to the cell terminals of the electro-chemical cells that are to be connected to one another and which said element connects the cell terminals to one another in an electrically conductive manner.

In accordance with the invention, one end of a signal line is fixed to an additional signal-line-system-side positioning element which is preferably formed of a metallic material.

The signal-line-system-side positioning element is easily fixable to a cell connector or to a current termination of the current line system, in particular, by means of a substance-to-substance bond such as by welding and in particular, by ultrasonic welding for example.

Due to the shape of the signal-line-system-side positioning element, a defined jointing position of the positioning element, in which the positioning element is jointed to a cell connector or a current termination, is fully maintainable.

The signal-line-system-side positioning element can be made of a sheet metal material for example.

The signal-line-system-side positioning element can be in the form of a stamped bent part.

When the cell connectors of the current line system are arranged next to each other in an X-direction and/or a Y-direction of the cell contacting system and are arranged over the cell terminals of the electro-chemical cells that are to be connected to one another in the assembled state of the cell contacting system in a Z-direction, wherein the X-direction, the Y-direction and the Z-direction are oriented perpendicularly to each other in pairs, the signal-line-system-side positioning element preferably exhibits a high degree of rigidity in the X-direction and/or in the Y-direction.

Furthermore, the signal-line-system-side positioning element preferably exhibits a high degree of flexibility in the Z-direction.

The high degree of flexibility in the Z-direction can, for example, be achieved in that the signal-line-system-side positioning element preferably has a thin wall thickness or material thickness.

In particular, provision may be made for the material thickness of the signal-line-system-side positioning element to amount to at most approximately 0.6 mm and in particular to at most approximately 0.3 mm.

Due to the signal-line-system-side positioning element being resistant to bending in at least the X-direction and/or in the Y-direction, a significantly more precise definition of the jointing position of this positioning element relative to the respectively associated cell connector or current termination of the current line system is achieved. The tolerance chain when assembling the cell contacting system thereby becomes smaller.

Moreover, due to the better defined boundary conditions, a higher quality of connection between the positioning element and the cell connector or current termination is achieved than would be the case in the event of a direct connection between an end of the signal line and the cell connector or the current termination.

Additional working steps for checking and alignment purposes during the assembly of the cell contacting system thereby become redundant.

The end of the signal line is held captive in a particularly secure manner, if the signal-line-system-side positioning element, which is fixed to the end of the signal line, is connected to the respectively associated carrier-element-side positioning element by latching, caulking or clamping.

The signal-line-system-side positioning element may comprise different materials or combinations of material such as copper, a copper alloy or a copper-zinc alloy for example.

The signal-line-system-side positioning element may comprise a surface coating or be formed without a surface coating.

A signal-line-system-side positioning element that is provided with a nickel plating is suitable, in particular, for the purposes of soldering it to the associated cell connector or current termination.

A signal-line-system-side positioning element that is provided with a nickel plating is suitable in particular for welding and in particular, ultrasonic welding to the associated cell connector or current termination.

The electrically conductive connection between an end of the signal line and the signal-line-system-side positioning element can be established, in particular, by a crimping process.

In particular, provision may be made for the signal-line-system-side positioning element to comprise one, two or more crimping elements for crimping the signal line to the positioning element.

If a plurality of signal lines are to be attached to the same cell connector or current termination, then the plurality of signal lines can be fixed to the signal-line-system-side positioning element and the signal-line-system-side positioning element associated with the plurality of signal lines can be connected in electrically conductive manner to the cell connector or the current termination concerned.

This offers the advantage that the parameters for the connection between the signal-line-system-side positioning element and the cell connector or current termination are independent of the number of signal lines that are connected to the signal-line-system-side positioning element.

The process of fixing a plurality of signal lines to the same signal-line-system-side positioning element can, for example, be effected by inserting the ends of the plurality of signal lines into a cable-crimp that is provided on the signal-line-system-side positioning element.

In a preferred embodiment of the invention, provision is made for the signal-line-system-side positioning element to be formed from an electrically conductive material such as copper or a copper alloy for example.

Furthermore, provision is preferably made for the signal-line-system-side positioning element to be connected in electrically conductive manner to the associated signal line and to the associated cell connector or current termination.

The signal-line-system-side positioning element can be fixed to the associated cell connector or current termination by a substance-to-substance bond process or positive engagement and in particular, by welding, soldering, crimping, riveting and/or by a screw-type connection.

In particular hereby, the welding process can be an ultrasonic welding process, a laser welding process or a resistance welding process.

The signal-line-system-side positioning element can be fixed to the associated signal line by welding, soldering, crimping, insulation crimping and/or riveting.

Herein, insulation crimping is to be understood as being a crimping process in which the crimped signal line is provided with a covering of an electrically insulating material in the region of the crimp.

The welding process may be an ultrasonic welding process, a laser welding process or a resistance welding process for example.

In a preferred embodiment of the invention, provision is made for the signal line to comprise a plurality of individual conductors or stranded conductors.

In a special embodiment of the invention, provision is made for the signal line that is associated with the signal-line-system-side positioning element to be fixed to a terminal region of the signal-line-system-side positioning element which is spaced from the associated cell connector or current termination.

The end of the signal line is thereby decoupled from the position at which the signal-line-system-side positioning element is connected in electrically conductive manner to the respectively associated cell connector or current termination and in particular, welded thereto.

The fixing of the end of the signal line can be effected in particular by a crimping process by means of a cable-crimp which is provided on the signal-line-system-side positioning element.

The signal line can also be additionally connected to the signal-line-system-side positioning element in the region of the cable-crimp by means of a substance-to-substance bond such as by welding for example and in particular by resistance welding.

As an alternative or in addition thereto, provision may be made for the signal line that is associated with the signal-line-system-side positioning element to be fixed to a contact region of the signal-line-system-side positioning element which is located on the associated cell connector or current termination.

In this case, the signal line is supported and located precisely in position-by the signal-line-system-side positioning element.

The end of the signal line in this case runs up to the point at which the carrier-element-side positioning element is connected in electrically conductive manner to the associated cell connector or current termination.

The end of the signal line can be fixed to the contact region of the signal-line-system-side positioning element, in particular, by crimping.

In this embodiment of the cell contacting system, there is no additional contact resistance.

Furthermore, provision may be made for a section of the signal line that is located before a stripped end of the signal line and is provided with an electrically insulating covering to be fixed to the signal-line-system-side positioning element by insulation crimping by means of an iso-crimp which is provided on the signal-line-system-side positioning element.

The carrier-element-side positioning element preferably comprises a plurality of positioning projections between which there is formed a positioning gap through which the signal-line-system-side positioning element extends.

The carrier-element-side positioning element is preferably formed from an electrically insulating material and in particular, from a plastics material.

In one preferred embodiment of the invention, provision is made for the carrier-element-side positioning element to be formed in one piece with the carrier element.

For example, provision may be made for the carrier element to be manufactured together with the carrier-element-side positioning element in an injection molding process in the form of a one piece injection molded part.

As an alternative thereto, provision could also be made for the carrier-element-side positioning element to be manufactured separately from the carrier element and to be connected thereto, in particular, by a substance-to-substance bond and/or positive engagement such as by a screw-type connection, a riveting process and/or a latching process for example.

In order to position the signal-line-system-side positioning element and thus too the end of the signal line affixed thereto on the carrier element in captive manner, provision may be made for the signal-line-system-side positioning element to be connected at least temporarily to the carrier-element-side positioning element by a latching process, a caulking process and/or a clamping process.

The cell connectors of the current line system can be arranged next to each other in an X-direction and/or in a Y-direction of the cell contacting system and be arranged over the cell terminals of the electro-chemical cells that are to be connected to one another in a Z-direction in the assembled state of the cell contacting system, wherein the X-direction, the Y-direction and the Z-direction are oriented perpendicularly to each other in pairs.

Is it expedient hereby, if a contact region of the signal-line-system-side positioning element with which the signal-line-system-side positioning element is fixed to the associated cell connector or current termination is held on the carrier-element-side positioning element such as to be displaceable relative to the carrier-element-side positioning element along the Z-direction.

Hereby, provision is preferably made for the signal-line-system-side positioning element to be prevented from being separated from the carrier-element-side positioning element by means of an undercut in the carrier-element-side positioning element and/or in the signal-line-system-side positioning element.

The signal-line-system-side positioning element is thus preferably held captive at least temporarily on the carrier-element-side positioning element during the process of assembling the cell contacting system.

As an alternative or in addition thereto, provision may be made for the signal-line-system-side positioning element to comprise a contact region by means of which the signal-line-system-side positioning element is fixed to the associated cell connector or current termination, a terminal region at which the signal-line-system-side positioning element is fixed to the associated signal line, and a deformation region which is arranged between the contact region and the terminal region, wherein the deformation region is deformable in such a way that the contact region of the signal-line-system-side positioning element is movable relative to the terminal region along the Z-direction.

The deformation region is preferably flexural in the Z-direction.

The deformation region may comprise at least one undulation for example.

The signal-line-system-side positioning element and the carrier-element-side positioning element may comprise a guidance device by means of which the signal-line-system-side positioning element is guided on the carrier-element-side positioning element and is displaceable relative to the carrier-element-side positioning element along the Z-direction.

Such a guidance device may comprise one or more guide elements on the signal-line-system-side positioning element.

Furthermore, such a guidance device may comprise one or more guide surfaces on the carrier-element-side positioning element.

Furthermore, provision may be made for the carrier-element-side positioning element to be arranged on a carrier section of the carrier element, wherein the carrier section is connected to a base body of the carrier element in such a way that the carrier section with the carrier-element-side positioning element is movable relative to the base body of the carrier element along the Z direction.

Hereby, the movement of the carrier section relative to the base body could also be a pivotal movement or a movement running at an angle to the Z-direction, as long as this movement has a component along the Z-direction.

In principle, the current line system can be formed and manufactured separately from the cell contacting system.

In a special embodiment of the invention, provision is made for the current line system to be in the form of a component of the cell contacting system and preferably to be carried by the carrier element of the cell contacting system.

The cell contacting system in accordance with the invention is suitable in particular for use in an electro-chemical device which comprises a plurality of electro-chemical cells and a cell contacting system in accordance with the invention.

The electro-chemical device is preferably in the form of an accumulator such as a lithium ion accumulator for example.

Furthermore, the present invention relates to a method of manufacturing a cell contacting system for an electro-chemical device which comprises a plurality of electro-chemical cells and a current line system, wherein the method comprises the following:

producing a signal line system having one or more signal lines for connecting in electrically conductive manner a respective signal source to a signal line termination or a monitoring device of the cell contacting system;

wherein the signal line system is carried by a carrier element of the cell contacting system in the assembled state of the cell contacting system.

The further object of the present invention is to provide such a method which is implementable in a reliable and simple manner and without the need, insofar as possible, for checking and correcting steps following a positioning process.

In accordance with the invention, this object is achieved by a method in accordance with the first part of Claim 18 by the following:

fixing a signal line of the signal line system to a signal-line-system-side positioning element;

connecting the signal-line-system-side positioning element to a carrier-element-side positioning element which is fixed to the carrier element so that the signal-line-system-side positioning element is positioned in a desired position relative to a cell connector or a current termination of the current line system;

fixing the signal-line-system-side positioning element to the associated cell connector or current termination.

Special embodiments of such a method have already been described hereinabove in connection with special embodiments of the cell contacting system in accordance with the invention.

The carrier-element-side positioning element can remain connected to the carrier element and/or to the signal-line-system-side positioning element after the signal-line-system-side positioning element has been fixed to the associated cell connector or current termination.

As an alternative thereto, provision could also be made for the carrier-element-side positioning element to be released from the carrier element and/or from the signal-line-system-side positioning element after the signal-line-system-side positioning element has been fixed to the cell connector or the current termination.

In this case, one can dispense with the process of constructing the signal-line-system-side positioning element and/or the carrier-element-side positioning element in such a way as to enable a relative movement between a contact region of the signal-line-system-side positioning element, which is fixed to the associated cell connector or current termination, and the carrier element along the Z-direction of the cell contacting system.

Further features and advantages of the invention form the subject matter of the following description and the graphical illustration of exemplary embodiments.

BRIEF DESCRIPTION OF THE DRAWINGS

FIG. 2 a further perspective illustration of the carrier element, the current line system, the signal line system and the signal-line-system-side positioning elements as well as the carrier-element-side positioning elements depicted in FIG. 1, as seen from the upper left;

FIG. 3 a plan view from above of the carrier element, the current line system, the signal line system, the signal-line-system-side positioning elements and the carrier-element-side positioning elements depicted in FIGS. 1 and 2;

FIG. 4 a plan view from above of the cell contacting system corresponding to FIG. 3, after a covering element has been placed on the carrier element;

FIG. 5 an enlarged illustration of the region I depicted in FIG. 1;

FIG. 6 a perspective illustration of the signal-line-system-side positioning element depicted in FIG. 5, without the carrier-element-side positioning element and without the carrier element;

FIG. 8 an enlarged illustration of the region II depicted in FIG. 1;

FIG. 9 a perspective illustration of the signal-line-system-side positioning element depicted in FIG. 8, without the carrier-element-side positioning element and without the carrier element;

FIG. 13 a longitudinal section through the signal-line-system-side positioning element, the associated carrier-element-side positioning element and the cell connector depicted in FIG. 11, along the line 13-13 in FIG. 3;

Similar or functionally equivalent elements are denoted by the same reference symbols in all of the Figures.

DETAILED DESCRIPTION OF THE INVENTION

Figure 1:
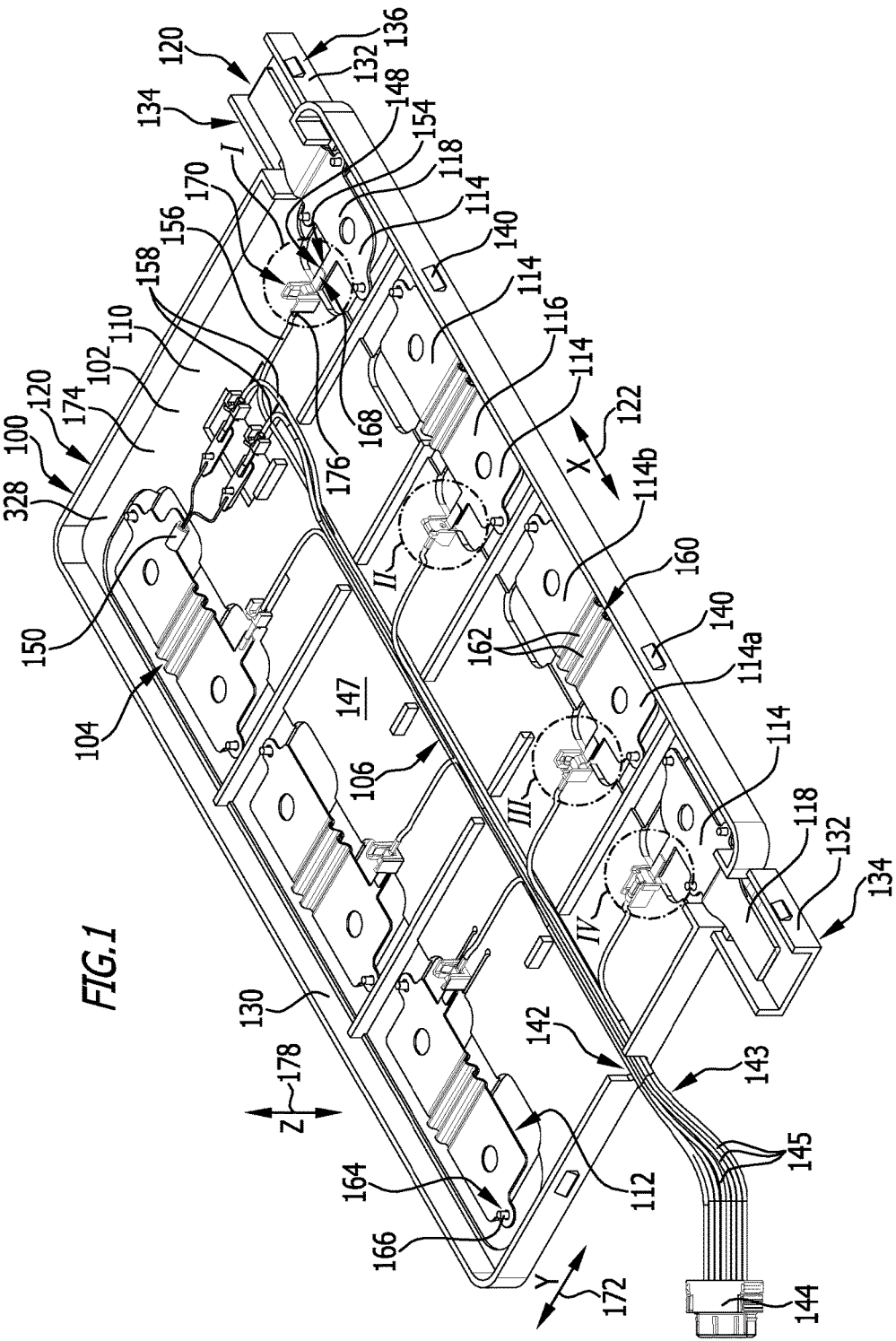
FIG. 1 shows a perspective illustration of a carrier element of a cell contacting system for an electro-chemical device, in particular an accumulator module, a current line system which is held on the carrier element, a signal line system which is held on the carrier element and a plurality of embodiments of signal-line-system-side positioning elements and carrier-element-side positioning elements which cooperate therewith, wherein a respective signal-line-system-side positioning element is connected at least temporarily to an associated carrier-element-side positioning element in such a way that the signal-line-system-side positioning element is held in a desired position relative to a cell connector of the current line system, as seen from the upper right.

A cell contacting system which is illustrated in FIGS. 1 to 20 and bears the general reference 100 comprises a carrier element 102 on which a current line system 104 and a signal line system 106 are held, and a covering element 108 which is placeable on the carrier element 102 and is illustrated in FIG. 4.

The carrier element 102 is placeable on a housing 109 (illustrated in FIG. 21) of an electro-chemical device 111 such as an e.g. accumulator module having a plurality of electro-chemical cells 113, in particular accumulator cells, and, in the assembled state of the electro-chemical device 111, said carrier element closes an upper housing opening through which the cell terminals 115 of the electro-chemical cells 113 of the electro-chemical device 111 protrude.

The carrier element 102 can preferably be in the form of a substantially rectangular mounting plate 110 for example.

The carrier element 102 is provided with a plurality of through openings 112, wherein each through opening 112 is associated on one side with a respective contact region 114 of a cell connector 116 or a current termination 118 and, at the other side, it is associated with a respective cell terminal 115 of the electro-chemical cells 113 of the electro-chemical device 111 so that a respective cell terminal 115 is connect-able through such an opening 112 with an associated contact region 114 of a cell connector 116 or a current termination 118.

In this embodiment, the cell connectors 116 form elements which connect the cell terminals 115 and hence the cell poles of the electro-chemical cells 113 to one another in electrically conductive manner i.e. they are provided in addition to the cell terminals 115.

As an alternative thereto, provision could also be made for the cell terminals 115 to be designed and fixed directly together in such a way that they connect the cell poles of the respective electro-chemical cells 113 to one another in electrically conductive manner and thus themselves (in particular, respectively in pairs) form a cell connector 116.

Hereby for example, a cell terminal 115 can extend through the through opening 112 in order to come into contact with a contact region 114 of a cell connector 116 or a current termination 118.

As an alternative thereto, a contact region 114 of a cell connector 116 or a current termination 118 could also extend through the respectively associated through opening 112 in order to come into contact with the respectively associated cell terminal 115.

Furthermore, it is also conceivable for both the cell terminal 115 and the contact region 114 of the cell connector 116 and/or the current termination 118 to extend into the through opening 112 and be connected to one another therein.

As can be perceived from FIGS. 1 to 3, the through openings 112 of the carrier element 102 can be arranged in a plurality of rows 120, wherein the rows 120 extend in a longitudinal direction 122 of the carrier element 102 for example.

This longitudinal direction 122 of the carrier element 102 is also referred to hereinafter as the X-direction of the cell contacting system 100.

The through openings 112 can, in particular, be substantially rectangular and in particular have rounded off corner regions; in principle however, other shapes for the through openings 112 are possible, in particular, circular, oval, square or polygonal through openings 112.

The covering element 108, which serves for covering the current line system 104 and the signal line system 106, is arranged on the upper side of the carrier element 102 which is remote from the electro-chemical cells 113 in the assembled state of the cell contacting system 100.

The covering element 108 is in the form of a substantially rectangular cover plate 124 for example.

The covering element 108 and/or the carrier element 102 preferably comprises a thermoplastic material such as polypropylene for example.

Preferably, the covering element 108 and/or the carrier element 102 is formed substantially entirely from a thermoplastic material such as from polypropylene for example.

Furthermore, as can be perceived from FIG. 4, the covering element 108 is preferably provided with an edge region 126 which runs around an outer edge and projects towards the carrier element 102 in the assembled state of the cell contacting system 100.

The edge region 126 of the covering element 108 may be interrupted by two through channels 128 which project from the edge of the covering element 108, forwardly or to the rear in the X-direction 122 for example, and which may have a substantially U-shaped cross section for example.

As can best be perceived from FIGS. 1 and 2, the carrier element 102 is also provided with an edge region 130 which runs around an outer edge and projects towards the covering element 108 in the assembled state of the cell contacting system 100.

The edge region 130 of the carrier element 102 may also be interrupted by two through channels 132 which project from the edge of the carrier element 102, preferably forwardly or to the rear in the X-direction 122, and which may have a substantially U-shaped cross section for example.

The through channels 132 of the carrier element 102 and the through channels 128 of the covering element 108 are arranged at mutually corresponding positions of the respective edge regions 130 and 126 and with the open sides thereof facing each other so that together the through channels 132, 128 form a respective through shaft 134 which serves for accommodating a respective one of the current terminations 118 of the cell contacting system 100.

The current terminations 118 and the cell connectors 116, by means of which the respective cell terminals 115 of two mutually neighboring electro-chemical cells 113 of different polarity are connectable to one another in electrically conductive manner, together form the current line system 104 of the cell contacting system 100.

The current line system 104 serves the purpose of enabling a current to flow between the electro-chemical cells 113 of the electro-chemical device 111 and to or from the current terminations 118 of the cell contacting system 100.

The electro-chemical cells 113 of the electro-chemical device 111 are connected electrically in series by means of this current line system 104 for example.

Figure 21:
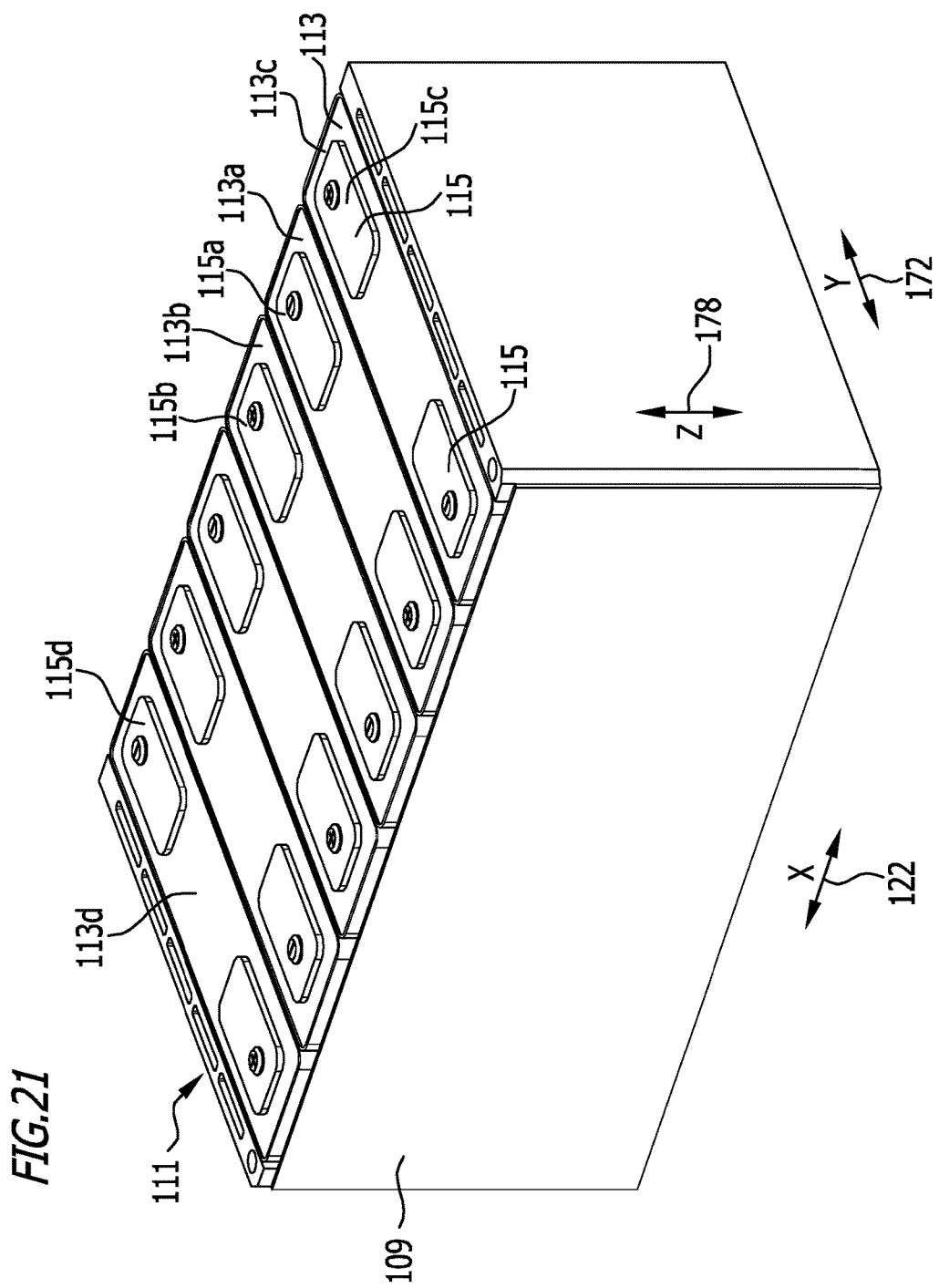
FIG. 21 a perspective illustration of an electro-chemical device incorporating a housing and a plurality of electro-chemical cells arranged therein wherein the cell contacting system illustrated in FIGS. 1 to 4 is placeable on the housing and is connectable to cell terminals of the electro-chemical cells in electrically conductive manner.

Hereby, each cell connector 116 connects a first cell terminal 115a of negative polarity of a first electro-chemical cell 113a to a second cell terminal 115b of positive polarity of a neighboring second electro-chemical cell 113b (see FIG. 21).

A cell terminal 115c of the electro-chemical cell 113c forming the beginning of the cell-series-circuit of the electro-chemical device and a cell terminal 115d of the electro-chemical cell 113d forming the end of the cell-series-circuit are each connected in electrically conductive manner to one of the electrically conductive current terminations 118 of the cell contacting system 100.

A plurality of electro-chemical devices 111 each having a respective cell contacting system 100 are preferably connected electrically in series.

In particular, such a series circuit can be established by connecting a current termination 118 of a first electro-chemical device 111 in electrically conductive manner to an electrical current termination 118 (of opposite polarity) of a second electro-chemical device 111 by means of a (not illustrated) module connector.

In order to enable the covering element 108 to be fixed to the carrier element 102 in releasable manner, there is preferably provided a latching device 136 which comprises one or more latching elements 138 that are provided on the covering element 108 and one or more latching elements 140 that are provided on the carrier element 102.

The latching elements 138 on the covering element side and the latching elements 140 on the carrier-element side are arranged at mutually corresponding positions of the edge region 126 of the covering element 108 and the edge region 130 of the carrier element 102 and latch together when the covering element 108 is placed on the carrier element 102 so that the covering element 108 is held on the carrier element 102 in releasable manner by means of the latching device 136.

The edge region 130 of the carrier element 102 is preferably provided with a connection opening 142 through which a signal cable harness 143 consisting of a plurality of signal lines 145 that are attached to a signal line termination 144 is fed out from an interior space 147 of the cell contacting system 100 which is surrounded by the carrier element 102 and the covering element 108.

The signal line termination 144 is accessible from the exterior of the cell contacting system 100 for the purposes of contacting it to a signal line element that is complementary to the signal line termination 144.

The signal line termination 144 can be in the form of a signal line plug for example.

In this case, the signal line element that is complementary to the signal line termination 144 is preferably in the form of a signal line socket.

The signal line termination 144 serves for attaching the signal line system 106 which is arranged on the carrier element 102 to a (not illustrated) monitoring device of the electro-chemical device 111 via a (not illustrated) preferably multipolar, feeder line.

The signal line system 106 serves for connecting one or more voltage tapping points 148 to a respective cell connector 116 or current termination 118 and/or from one or more temperature sensors 150 of the cell contacting system 100 to the signal line termination 144.

The signal line system 106 comprises the signal lines 145 which each connect a respective signal source 154 in electrically conductive manner to the signal line termination 144 (or directly to a monitoring device of the cell contacting system 100).

If the signal source 154 is a voltage tapping point 148 on a cell connector 116 or on a current termination 118, then this signal source 154 is connected over a voltage tapping line 156 to the signal line termination 144.

The voltage tapping points 148 are each arranged on a respective contact region 114 of a cell connector 116 or a current termination 118 of the cell contacting system 100 in order to enable the respective electric potential prevailing there to be tapped off.

If the signal source 154 is a temperature sensor 150, then the signal source 154 is connected by means of one or more temperature measuring wires 158 in electrically conductive manner to the signal line termination 144 (or directly to a monitoring device of the cell contacting system 100).

Preferably, the temperature sensors 150 are likewise in contact with a contact region 114 of a cell connector 116 or a current termination 118 of the cell contacting system 100 in order to enable the temperature prevailing there to be measured.

Each of the contact regions 114 of the cell connector 116 and each current termination 118 is associated with a respective cell terminal 115 of the electro-chemical device 111 and is connected in electrically conductive manner, preferably by means of a substance-to-substance bond, to the respectively associated cell terminal 115 in the assembled state of the electro-chemical device 111.

Each cell connector 116 comprises two contact regions 114 for electrically contacting a respective cell terminal 115, and a compensation region 160 which connects the two contact regions 114 to one another.

The compensation region 160 is preferably resiliently and/or plastically deformable in order to provide the possibility for a relative movement of the two contact regions 114 of the cell connector 116 relative to each other during operation of the electro-chemical device 111 and/or to compensate for tolerances when assembling the cell contacting system 100.

For this purpose in particular, the compensation region 160 may comprise one or more compensating undulations 162 that run transverse to a connecting direction which interconnects a center of the first contact region 114*a* to a center of the second contact region 114*b* of the cell connector 116.

Each contact region 114 of a cell connector 116 or of a current termination 118 can be positioned by means of a respective positioning hole 164 on a respectively associated positioning pin 166 of the carrier element 102.

Preferably hereby, the positioning pin 166 of the carrier element 102 passes through the respectively associated positioning hole 164 of the cell connector 116 or the current termination 118.

The carrier element 102 and/or the covering element 108 preferably comprises an electrically non-conductive plastics material such as PBT (polybuteneterephthalate), PP (polypropylene), PA (polyamide), ABS (acrylonitrile butadiene styrene) and/or LCP ("Liquid Crystal Polymer") for example, and is preferably formed substantially entirely of such a plastics material.

A particularly suitable material for the carrier element 102 is a polypropylene material strengthened with talcum (for example bearing the material the designation PPT TV 20). This material has a particularly high inherent stability due to the talcum reinforcement.

At least one signal line 145 of the signal line system 106, preferably at least one voltage tapping line 156 and in particular all of the voltage tapping lines 156 of the signal line system 106, is connected in electrically conductive manner to a signal-line-system-side positioning element 168 which is fixed to the signal line concerned 145 on the one hand and to a cell connector 116 or to a current termination 118 of the current line system 104 on the other.

Each signal-line-system-side positioning element 168 is connected at least temporarily and in particular during the assembly of the cell contacting system 100 to a respectively associated carrier-element-side positioning element 170, namely, in such a way that the signal-line-system-side positioning element 168 is held in a desired position relative to a cell connector 116 or a current termination 118 of the current line system 104 by the carrier-element-side positioning element 170.

Preferably hereby, only the position of the signal-line-system-side positioning element 168 along the X-direction 122 and along a Y-direction 172 is fixed by the cooperation of the carrier-element-side positioning element 170 and the signal-line-system-side positioning element 168, wherein the Y-direction 172 is oriented perpendicularly to the X-direction 122 of the cell contacting system 100 and preferably substantially parallel to a major face 174 of the carrier element 102 so that the cell connectors 116 and the current terminations 118 of the cell contacting system 100 are arranged next to each other on the carrier element 102 in the plane spanned by the X-direction 122 and the Y-direction 172.

However, at least one contact region 182 of the signal-line-system-side positioning element 168 which abuts on the respectively associated cell connector 116 or current termination 118 in the assembled state of the cell contacting system 100 and which is connected thereto in electrically conductive manner, preferably by means of a substance-to-substance bond, is preferably moveable relative to the carrier-element-side positioning element 170 along a Z-direction 178, whereas the carrier-element-side positioning element 170 fixes the position of the signal-line-system-side positioning element 168 in the plane spanned by the X direction 122 and the Y-direction 172. Hereby, the Z-direction 178 is oriented perpendicularly to the X-direction 122 and perpendicularly to the Y-direction 172.

Preferably, the Z-direction 178 of the cell contacting system 100 is oriented substantially parallel to the direction along which the cell terminals 115 of the electro-chemical cells 113 project from the respective cell housing (see FIG. 21).

Figure 7:
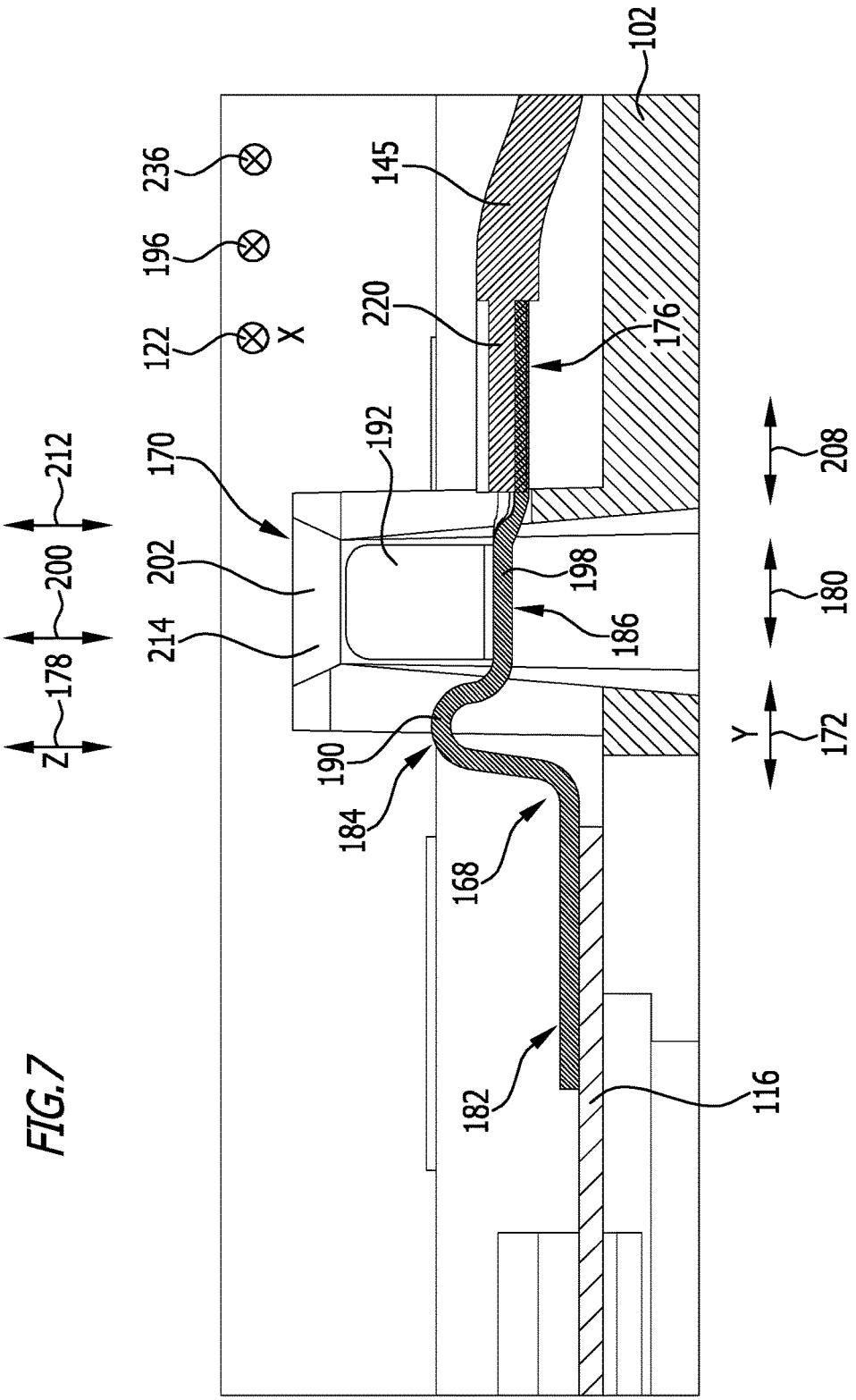
FIG. 7 a longitudinal section through a signal-line-system-side positioning element corresponding to the signal-line-system-side positioning element depicted in FIGS. 5 and 6 as well as an associated carrier-element-side positioning element and a cell connector, along the line 7-7 in FIG. 3.

One possible embodiment of a signal-line-system-side positioning element 168 and of a carrier-element-side positioning element 170 that is associated therewith is illustrated in detail in FIGS. 5 to 7.

In this embodiment, the signal-line-system-side positioning element 168 comprises the contact region 182 which abuts on the respectively associated cell connector 116 or current termination 118 in the assembled state of the cell contacting system 100 and is connected thereto in electrically conductive manner, preferably by means of a substance-to-substance bond, a deformation region 184 which adjoins the contact region 176 in a longitudinal direction 180 of the signal-line-system-side positioning element 168, a connecting region 186 which adjoins the deformation region 184 in the longitudinal direction 180 on that side of the deformation region 184 that is remote from the contact region 182 and a terminal region 176 which adjoins the connecting region 186 in the longitudinal direction 180 on that side of the connecting region 186 that is remote from the deformation region 184 and the contact region 182.

The contact region 182, the deformation region 184, the connecting region 186 and the terminal region 176 of the signal-line-system-side positioning element 168 are preferably formed in one piece with one another and together form a one-piece base body 188 of the signal-line-system-side positioning element 168.

The contact region 182 of the signal-line-system-side positioning element 168 is fixed to the associated cell connector 116 or current termination 118 by welding, in particular, by ultrasonic welding, laser welding or resistance welding, by soldering, crimping and/or riveting for example.

The signal-line-system-side positioning element 168 comprises an electrically conductive material and is preferably formed substantially entirely from an electrically conductive material.

Such an electrically conductive material is, in particular, a metallic material such as copper or a copper alloy or aluminum or an aluminum alloy for example.

Combinations of materials such as copper and zinc for example are also possible for the signal-line-system-side positioning element 168.

Furthermore, the signal-line-system-side positioning element 168 can be provided with a surface coating which contains zinc or nickel for example.

A zinc containing surface coating thereby facilitates the production of a solder joint.

A nickel containing surface coating thereby facilitates the production of an ultrasonically welded connection.

The deformation region 184 serves the purpose of enabling a relative movement of the contact region 182 and the connecting region 186 of the signal-line-system-side positioning element 168 relative to each other when the electro-chemical device 111 is in operation and/or to compensate for tolerances during the process of assembling the cell contacting system 100.

For this purpose in particular, the deformation region 184 may comprise one or more undulations 190 which run transverse to the longitudinal direction 180 of the signal-line-system-side positioning element 168.

Such an undulation 190 makes it possible to achieve flexibility of the signal-line-system-side positioning element 168 in the Z-direction 178.

Particularly good flexibility of the deformation region 184 is obtained if the material thickness of the signal-line-system-side positioning element 168 amounts to at most approximately 0.6 mm and in particular to at most approximately 0.3 mm in the deformation region 184 and particularly preferred, in the entire base body 188.

The connecting region 186 serves the purpose of connecting the signal-line-system-side positioning element 168 at least temporarily and in particular during the process of assembling the cell contacting system 100 to the respectively associated carrier-element-side positioning element 170.

In particular, such a connection can be effected by latching, caulking and/or clamping.

For the purposes of latching with the carrier-element-side positioning element 170, the connecting region 186 in the exemplary embodiment illustrated in FIGS. 5 to 7 comprises one or more latching elements 192 in the form of latching tongues 194 for example which are arranged laterally beside a central section 198 of the connecting region 186 in a transverse direction 196 of the signal-line-system-side positioning element 168 running perpendicularly to the longitudinal direction 180 of the signal-line-system-side positioning element 168 and they extend substantially in a height direction 200 of the signal-line-system-side positioning element 168 which is oriented perpendicularly to the longitudinal direction 180 and perpendicularly to the transverse direction 196 of the signal-line-system-side positioning element 168 and substantially parallel to the Z direction 178 of the cell contacting system 100 in the assembled state of the cell contacting system 100.

For example, the carrier-element-side positioning element 170 that is illustrated by way of example in FIG. 5 comprises two positioning projections 202 which are spaced from each other in a transverse direction 236 of the carrier-element-side positioning element 170 that runs parallel to the X-direction 122 of the cell contacting system 100 for example and thus form therebetween a positioning gap 204 through which the signal-line-system-side positioning element 168 extends.

Hereby, the gap width G corresponds substantially to the width B of the signal-line-system-side positioning element 168 in the region of the positioning gap 204 (i.e. its extent in the transverse direction 196) so that the signal-line-system-side positioning element 168 is positioned in the desired manner in the transverse direction 196 thereof by the boundaries of the positioning gap 204.

Furthermore, each positioning projection 202 comprises a latch seating 206 that is bounded in the longitudinal direction 208 of the carrier-element-side positioning element 170 which coincides with the longitudinal direction 180 of the signal-line-system-side positioning element 168 in the assembled state of the cell contacting system 100 by two guide rails 210a and 210b which are spaced from each other in the longitudinal direction 208 and said latching element is bounded upwardly along the height direction 212 of the carrier-element-side positioning element 170 which coincides with the Z-direction 178 of the cell contacting system 100 by a latching element 214 in the form of a latching nose 216 for example.

A respective latching element 192 of the signal-line-system-side positioning element 168 is accommodated in each of the latch seatings 206 of the positioning projections 202 in such a way that the upper edge of the respective latching element 192 abuts on the latching element 214 of the carrier-element-side positioning element 170 and the lateral edges thereof abut on the guide rails 210.

The signal-line-system-side positioning element 168 is thus positioned relative to the carrier-element-side positioning element 170 and thus relative to the carrier element 102 and relative to the respectively associated cell connector 116 or current termination 118 in the desired manner in both the longitudinal direction 180 thereof and the height direction 200 thereof by the latching of the latching elements 192 of the signal-line-system-side positioning element 168 with the carrier-element-side positioning element 170.

The carrier-element-side positioning element 170, including its positioning projections 202, is preferably formed in one piece with the carrier element 102.

In particular, provision may be made for the carrier element 102 including the carrier-element-side positioning element 170 to be produced by means of an injection molding process.

The terminal region 176 of the signal-line-system-side positioning element 168 serves the purpose of fixing the signal-line-system-side positioning element 168 to the respectively associated signal line 145.

The signal line 145 preferably comprises a plurality of individual conductors or strands which are surrounded by an insulating coating or a sheath 218 consisting of an electrically insulating material.

This electrically insulating sheath 218 is removed in a stripped end section 220 of the signal line 145 so that an electrically conductive connection between the individual conductors of the signal line 145 and the signal-line-system-side positioning element 168 is producible.

Hereby, the signal-line-system-side positioning element 168 can be fixed to the associated signal line 145 by welding and in particular by ultrasonic welding, laser welding or resistance welding, by soldering, by crimping and/or by riveting for example.

In the exemplary embodiment illustrated in FIGS. 5 to 7, the end section 220 of the signal line 145 is connected in electrically conductive manner to the signal-line-system-side positioning element 168 by a crimping process by means of crimping elements 222 which are provided on the signal-line-system-side positioning element 168.

Provision could also be made for the end sections 220 of a plurality of signal lines 145 to be connected in electrically conductive manner to the signal-line-system-side positioning element 168.

In the case of a connection produced by means of a crimping process, the end sections 220 of a plurality of signal lines 145 are in this case inserted into the crimp which is formed by the crimping elements 222 of the signal-line-system-side positioning element 168.

In addition to the embodiment of a signal-line-system-side positioning element 168 and of a carrier-element-side positioning element 170 that is associated therewith which is illustrated in detail in FIGS. 5 to 7, yet further embodiments of such positioning elements 168 and 170 which are associated with other cell connectors 116 or current terminations 118 are illustrated in FIGS. 1 to 20.

However, this illustration of different embodiments of signal-line-system-side positioning elements 168 and carrier-element-side positioning elements 170 in the same cell contacting system 100 only serves for purposes of explanation.

In principle, it is also possible to form all of these positioning elements 168 and 170 such that they are substantially identical to one another.

Moreover, as many examples as desired of any embodiment of the positioning elements 168 and 170 that are illustrated in this description can be combined in a cell contacting system 100 with any arbitrary number of other embodiments of such positioning elements 168 and 170.

The previously described cell contacting system 100 is preferably completely pre-assembled as a separate component group of the electro-chemical device 111.

In the course of this pre-assembly process, the components of the current line system 104 and in particular the cell connectors 116 and the current terminations 118, as well as one or more temperature sensors 150 with terminating elements such as connecting leads for example are positioned on the carrier element 102.

The signal lines 145 are connected to the signal line termination 144 on the one hand and the end sections 220 thereof are connected to the respectively associated signal-line-system-side positioning element 168 on the other.

For example, the signal-line-system-side positioning elements 168 are produced by detaching a section of material from a source of material consisting of a metallic source material for example, and the detached section of material is then turned into the desired shape by forming processes, in particular, by bending processes and/or embossing processes.

Subsequently, the signal lines 145 of the signal line system 106 are arranged on the carrier element 102 in such a way that the signal-line-system-side positioning elements 168 are connected to the respectively associated carrier-element-side positioning element 170 in the desired position by means of a latching process for example.

Subsequently, the contact regions 182 of the signal-line-system-side positioning elements 168, which are positioned relative to the respectively associated cell connector 116 or current termination 118 in the desired manner, are connected in electrically conductive manner to the respective cell connector 116 or current termination 118, preferably, by means of a substance to substance bond and in particular by soldering or by welding such as ultrasonic welding, resistance welding or laser welding for example.

Thus all of the components that are needed for contacting the electro-chemical cells 113 of the electro-chemical device 111 and which are already in the relative positions required are combined into a component group in the form of a manageable unit, namely, into the cell contacting system 100.

When assembling the electro-chemical device 111, the carrier element 102 incorporating the current line system 104 and the signal line system 106 is placed on the housing 109 in which the electro-chemical cells 113 are arranged, and is connected to the edge of the housing 109 surrounding the housing opening.

Subsequently, the cell connectors 116 and the current terminations 118 are contacted in electrically conductive manner by the respectively associated cell terminals 115 of the electro-chemical device 111, for example, by means of a substance-to-substance bond and in particular by welding and/or by positive engagement.

After contact has been made between the current line system 104 and the cell terminals 115 of the electro-chemical cells 113 of the electro-chemical device 111, the covering element 108 is placed on the carrier element 102 and connected thereto, in particular, by latching so that the covering element 108 covers the current line system 104 and the signal line system 106 of the cell contacting system 100 and protects it from being touched inadvertently.

Damaging of the current line system 104 and the signal line system 106 during transportation and assembly of the electro-chemical device 111 is thereby prevented.

The fully assembled electro-chemical device 111 can be assembled with a plurality of other electro-chemical devices 111 and in particular accumulator modules so as to form an electro-chemical device group, wherein in particular, different electro-chemical devices 111 can be wired up by means of (not illustrated) module connectors which connect the current terminations 118 of the different electro-chemical devices 111 to one another.

Figure 10:
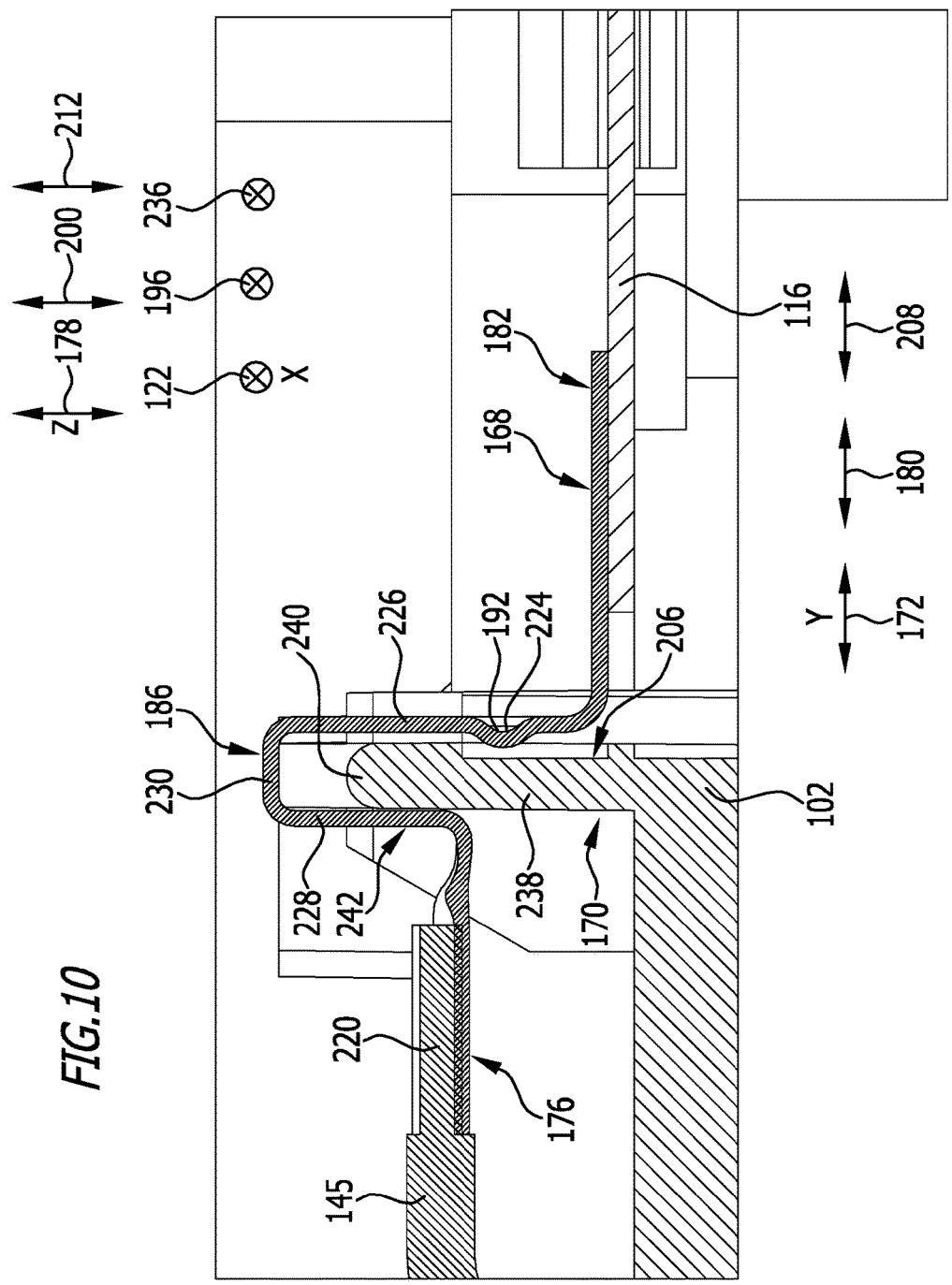
FIG. 10 a longitudinal section through the signal-line-system-side positioning element, the associated carrier-element-side positioning element and the associated cell connector depicted in FIG. 8, along the line 10-10 in FIG. 3.

A second embodiment of a signal-line-system-side positioning element 168 and an associated carrier-element-side positioning element 170 which is illustrated in FIGS. 8 to 10 differs from the first embodiment illustrated in FIGS. 5 to 7 in that the signal-line-system-side positioning element 168 is connected to the carrier-element-side positioning element 170 in such a way that, in the connected state, it is displaceable relative to the carrier-element-side positioning element 170 in the Z-direction 178 of the cell contacting system 100, in the height direction 200 of the signal-line-system-side positioning element 168 and in the height direction 212 of the carrier-element-side positioning element 170.

As can best be seen from FIG. 10, this is achieved in this embodiment in that the connecting region 186 of the signal-line-system-side positioning element 168 comprises a latching element 192 which is in the form of a latching nose 224 which projects towards the carrier-element-side positioning element 170 and engages in a latch seating 206 in the carrier-element-side positioning element 170 which extends to a greater extent in the Z direction 178 than the latching element 192.

The resiliently and/or flexibly deformable deformable-region 184 of the first embodiment of the signal-line-system-side positioning element 168 can be dispensed with in this embodiment.

In this embodiment for example, the connecting region 186 of the signal-line-system-side positioning element 168 has a substantially U-shaped cross section (as taken in the longitudinal direction 180) and it has a contact-region-side leg 226, a terminal-region-side leg 228 and a web 230 which connects the two legs 226 and 228 to one another (see FIG. 10).

The two legs 226 and 228 of the connecting region 186 are preferably oriented substantially parallel to the height direction 200 of the signal-line-system-side positioning element 168.

The latching element 192 is preferably arranged on the contact-region-side leg 226.

The web 230 preferably extends in the transverse direction 196 and in the longitudinal direction 180 of the signal-line-system-side positioning element 168.

In this embodiment as can best be perceived from FIGS. 8 and 10, the carrier-element-side positioning element 170 comprises two positioning projections 232 which are provided on the front faces thereof facing the respectively associated cell connector 116 or current termination 118 with a respective guide rail 234 which extends in the height direction 212 of the carrier-element-side positioning element 170.

The guide rails 234 are spaced from each other in the transverse direction 236 of the carrier-element-side positioning element 170 by a spacing G which substantially corresponds to the width B of the contact-region-side leg 226 of the connecting region 186 of the signal-line-system-side positioning element 168 so that the signal-line-system-side positioning element 168 is positioned in the transverse direction 196 in the desired manner by the carrier-element-side positioning element 170 and is guided in displaceable manner in the height direction 200.

Thus together, the contact-region-side leg 226 of the connecting region 186 of the signal-line-system-side positioning element 168 and the guide rails 234 of the carrier-element-side positioning element 170 form a guidance device 242 by means of which the signal-line-system-side positioning element 168 is guided on the carrier-element-side positioning element 170 such as to be displaceable in the Z-direction 178 of the cell contacting system 100.

As can best be perceived from the longitudinal section of FIG. 10, the two positioning projections 232 of the carrier-element-side positioning element 170 are connected together by a connecting wall 238 which extends in the transverse direction 236.

The latch seating 206 of the carrier-element-side positioning element 170 is preferably arranged on the front face of the connecting wall 238 which faces the contact-region-side leg 226 of the connecting region 186 of the signal-line-system-side positioning element 168.

The upper region 240 of the connecting wall 238 located above the latch seating 206 forms an undercut which limits the movement of the latching element 192 in the height direction 200 so that the signal-line-system-side positioning element 168 is held captive on the carrier-element-side positioning element 170.

The extent of the web 230 of the connecting region 186 of the signal-line-system-side positioning element 168 in the longitudinal direction 180 of the signal-line-system-side positioning element 168 substantially corresponds to the extent of the upper region 240 of the connecting wall 238 of the carrier-element-side positioning element 170 in the longitudinal direction 208 of the carrier-element-side positioning element 170, or is slightly larger than it, so that the signal-line-system-side positioning element 168 is also positioned in the longitudinal direction 180 thereof in the desired manner by the connecting wall 238 enclosed between the legs 226 and 228 of the connecting region 186.

The spacing between the web 230 and the latching element 192 along the height direction 200 of the signal-line-system-side positioning element 168 is greater than the extent of the upper region 240 of the connecting wall 238 of the carrier-element-side positioning element 170 in the height direction 212 thereof so that the displacement path of the latching element 192 in the latch seating 206 is not limited by a contact between the web 230 and the upper region 240 of the connecting wall 238.

In all other respects, the second embodiment of a signal-line-system-side positioning element 168 and a carrier-element-side positioning element 170 which is illustrated in FIGS. 8 to 10 corresponds in regard to the construction, functioning and method of production thereof with the first embodiment illustrated in FIGS. 5 to 7 and so to that extent reference should be made to the previous description thereof.

Figure 12:
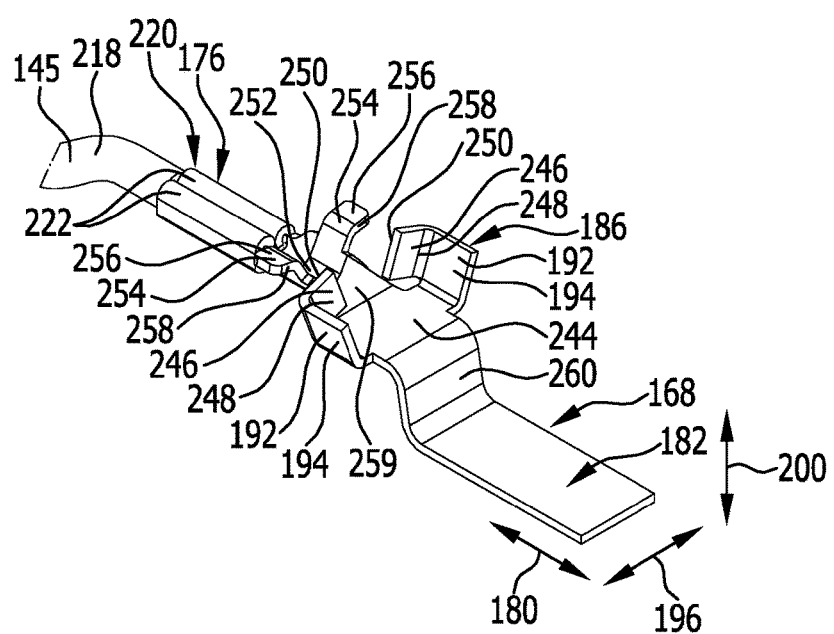
FIG. 12 a perspective illustration of the signal-line-system-side positioning element depicted in FIG. 11, without the carrier-element-side positioning element and without the carrier element.
Figure 11:
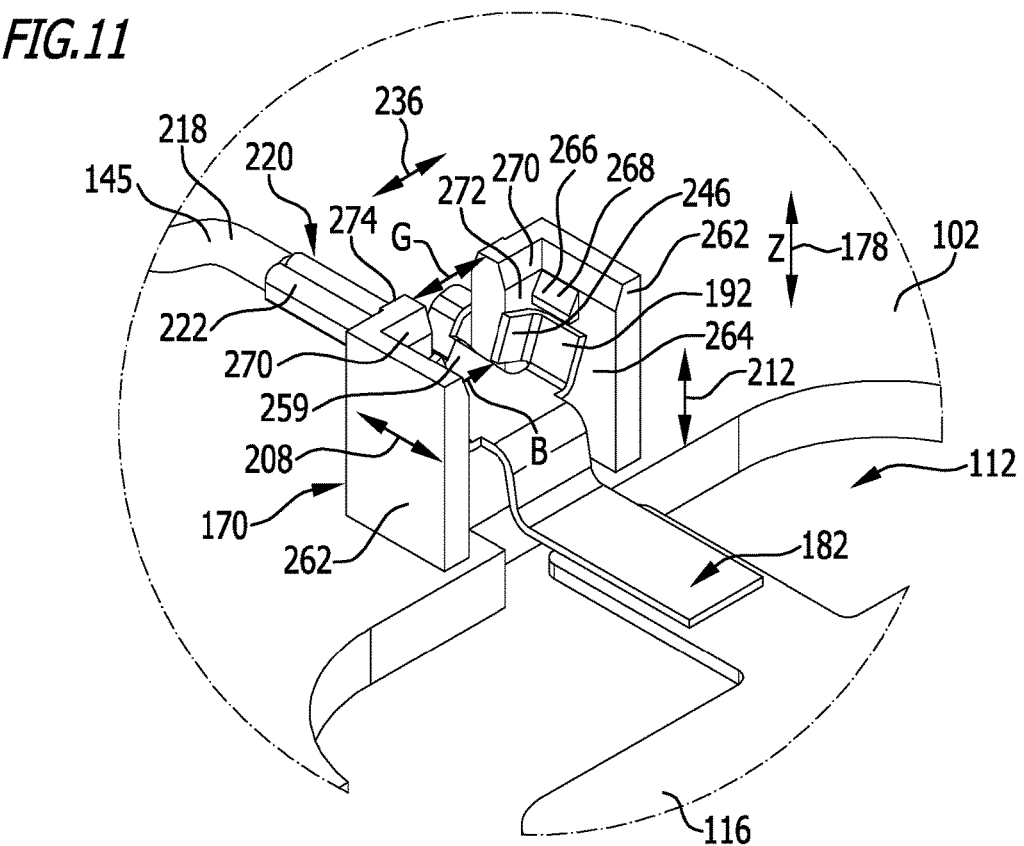
FIG. 11 an enlarged illustration of the region III depicted in FIG. 1.

A third embodiment of a signal-line-system-side positioning element 168 and an associated carrier-element-side positioning element 170 which is illustrated in FIGS. 11 to 13 differs from the second embodiment illustrated in FIGS. 8 to 10 in regard to the design of the connecting region 186 of the signal-line-system-side positioning element 168 and the guidance device 242.

In this embodiment, the connecting region 186 comprises a central section 244, from the long sides whereof, latching elements 192 in the form of latching tongues 194 for example extend away.

These latching elements 192 are preferably inclined both in relation to the transverse direction 196 and in relation to the height direction 200 of the signal-line-system-side positioning element 168.

A respective front guide element 246 in the form of a front guide lug 248 for example extends from a rearward end of each latching element 192 facing the terminal region 176 in such a way relative to the longitudinal center plane of the signal-line-system-side positioning element 168 that a rear face 250 of the respective guide element 246 facing the terminal region 176 is oriented substantially parallel to the transverse direction 196 and to the height direction 200.

A rear section 252 of the connecting region 186 carries two rear guide elements 254 in the form of rear guide lugs 256 for example which extend away from the long sides thereof.

The rear guide elements 254 are preferably inclined both in relation to the transverse direction 196 and in relation to the height direction 200 of the signal-line-system-side positioning element 168.

A front end face 258 of each rear guide element 254 which faces the rear face 250 of a respective front guide element 246 preferably runs substantially parallel to the transverse direction 196 and to the height direction 200 of the signal-line-system-side positioning element 168.

The rear section 252 and the central section 244 of the connecting region are connected to one another by an intermediate section 259.

The central section 244 of the connecting region 186 is connected to the contact region 182 of the signal-line-system-side positioning element 168 by means of a front section 260 of the connecting region 186 which is curved in the form of an S-shape in longitudinal section.

As can best be perceived from FIG. 11, the carrier-element-side positioning element 170 in this embodiment comprises two positioning projections 262 which are spaced from each other in the transverse direction 236 and which, on their mutually facing inner faces 264, carry a respective latching element 266 in the form of a latching nose 268 for example which limits the displacement path of the respectively associated latching element 192 of the signal-line-system-side positioning element 168 in the Z-direction 178 of the cell contacting system 100 so that the signal-line-system-side positioning element 168 is held captive on the carrier-element-side positioning element 170.

Furthermore, in this embodiment, the carrier-element-side positioning element 170 comprises two guide rails 270 which extend towards one another from a respective one of the positioning projections 162 and end away from each other with a spacing G along the transverse direction 236 of the carrier-element-side positioning element 170 which corresponds to the width B i.e. the extent in the transverse direction 196 of the intermediate section 259 of the connecting region 186 of the signal-line-system-side positioning element 168 which, in the assembled state of the cell contacting system 100, extends through between the guide rails 270 so that the signal-line-system-side positioning element 168 is positioned in the desired manner relative to the carrier-element-side positioning element 170 in the transverse direction 196.

Furthermore, the front guide elements 246 of the signal-line-system-side positioning element 168 each abut on a mutually facing front face 272 of the guide rails 270 and the rear guide elements 254 of the signal-line-system-side positioning element 168 each abut on a mutually facing rear face 274 of the guide rails 270 so that the signal line-system positioning element 168 is also positioned in the desired manner relative to the carrier-element-side positioning element 170 in the longitudinal direction 180 thereof due to the cooperation of the guide elements 246 and 254 of the signal-line-system-side positioning element 168 with the guide rails 270 of the carrier-element-side positioning element 170.

Hereby, the front guide elements 246, the rear guide elements 254 and the guide rails 270 together form the guidance device 242 by means of which the signal-line-system-side positioning element 168 is guided on the carrier-element-side positioning element 170 such as to be displaceable in the Z-direction 178.

In all other respects, the third embodiment of a signal-line-system-side positioning element 168 and a carrier-element-side positioning element 170 which is illustrated in FIGS. 11 to 13 corresponds in regard to the construction, functioning and method of production thereof with the second embodiment illustrated in FIGS. 8 to 10 and so to that extent reference should be made to the previous description thereof.

Figure 15:
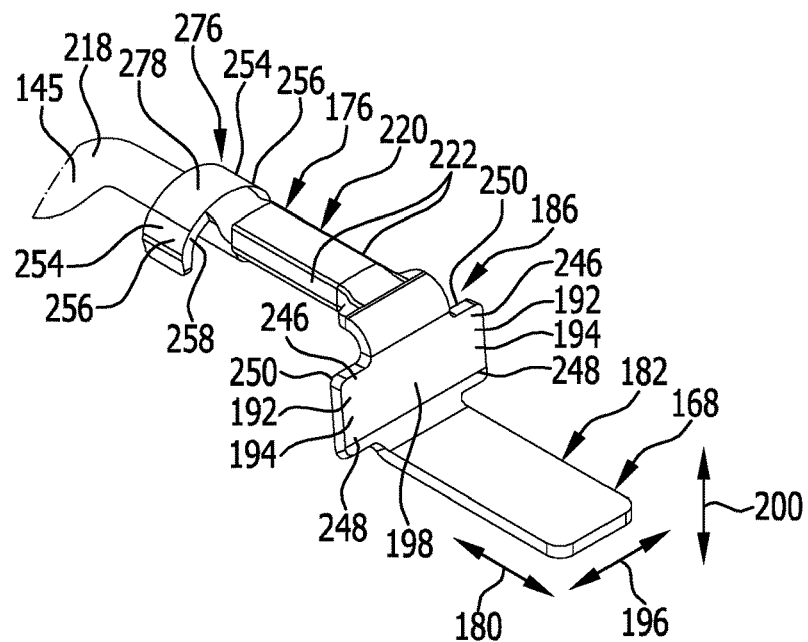
FIG. 15 a perspective illustration of the signal-line-system-side positioning element depicted in FIG. 14, without the carrier-element-side positioning element and without the carrier element.
Figure 14:
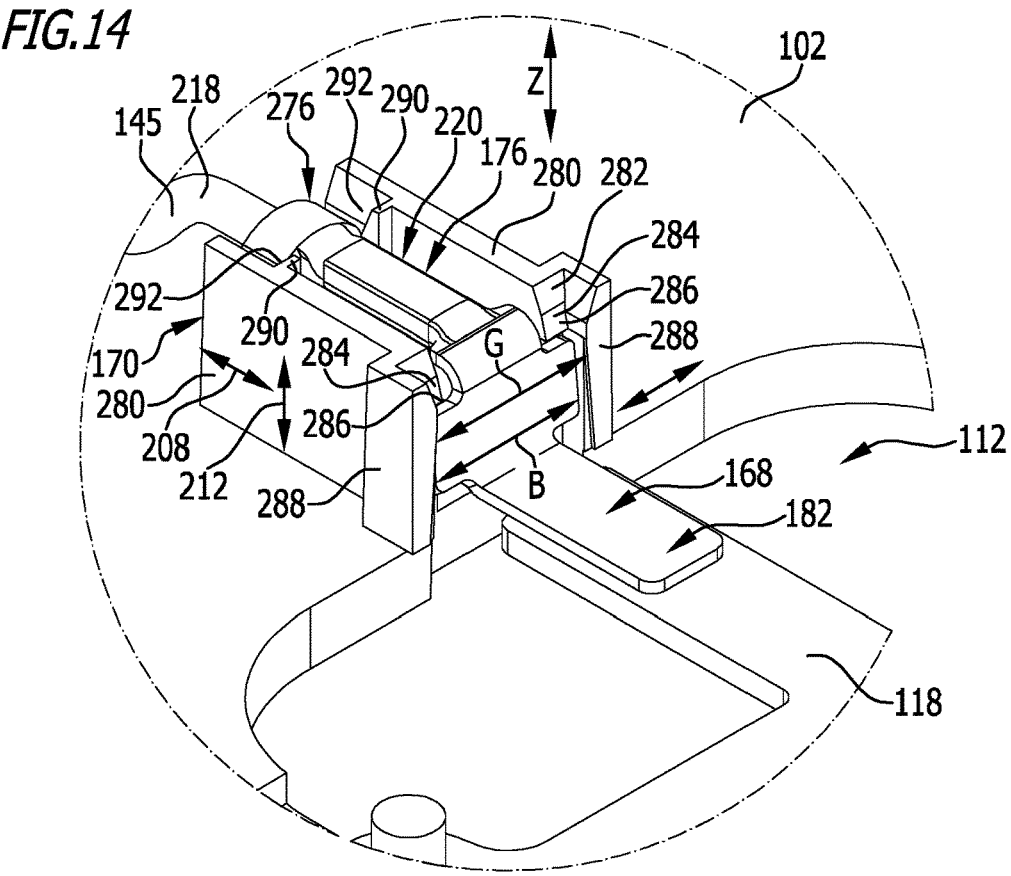
FIG. 14 an enlarged illustration of the region IV depicted in FIG. 1.
Figure 16:
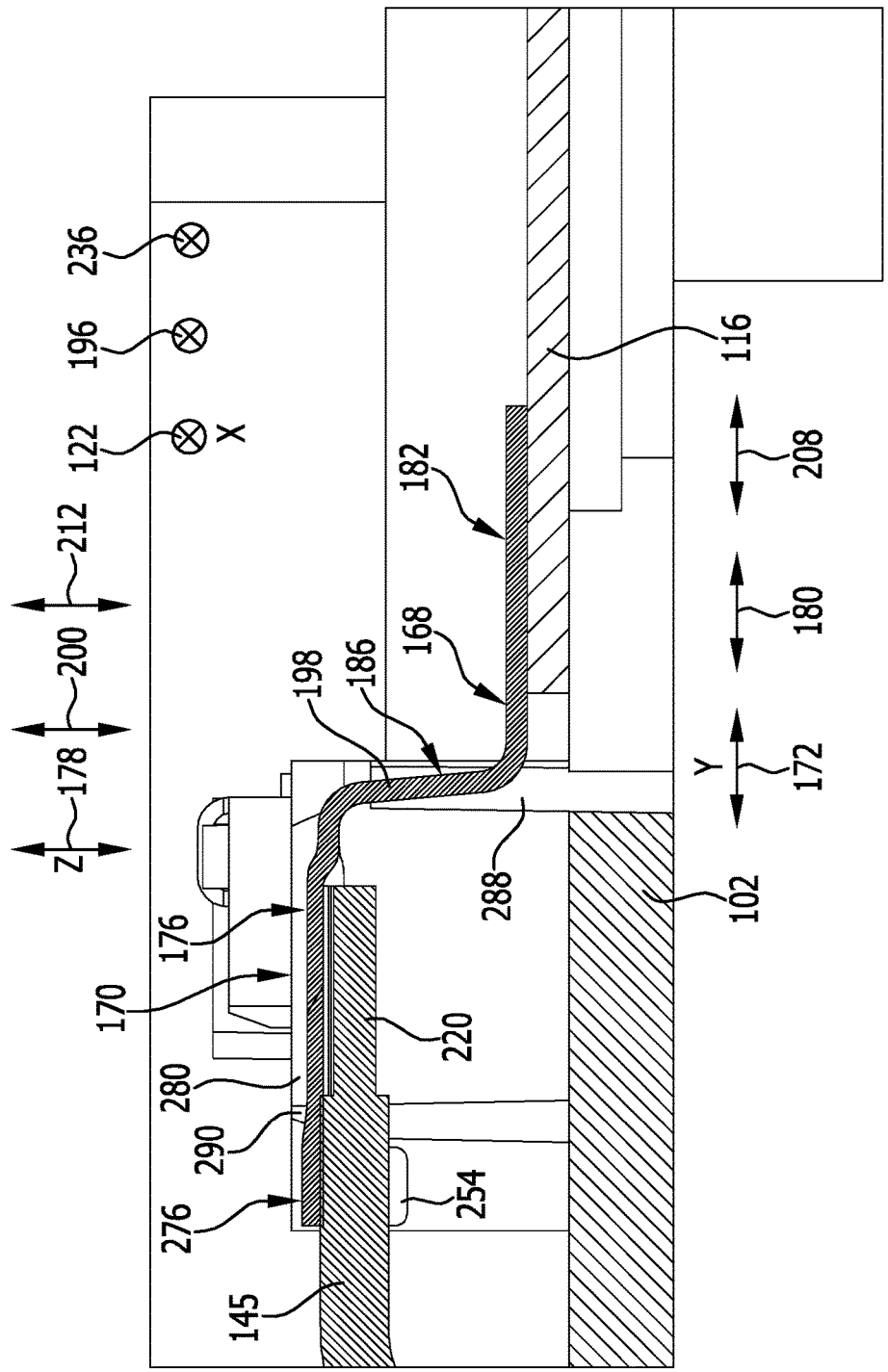
FIG. 16 a longitudinal section through the signal-line-system-side positioning element, the associated carrier-element-side positioning element and the associated current termination depicted in FIG. 14, along the line 16-16 in FIG. 3.

A fourth embodiment of a signal-line-system-side positioning element 168 and an associated carrier-element-side positioning element 170 which is illustrated in FIGS. 14 to 16 differs from the third embodiment illustrated in FIGS. 11 to 13 by the construction of the guidance device 242 as well as the construction of the latching elements on the signal-line-system-side positioning element 168 and on the carrier-element-side positioning element 170.

As can best be perceived from FIG. 15, in this embodiment of the signal-line-system-side positioning element 168, there follows on the contact region 182 a connecting region 186 which is S-shaped in longitudinal section along the longitudinal direction 180 and which comprises a central section 198 that extends in the height direction 200 and two latching elements 192 in the form of latching tongues 194 for example which extend away from the central section 198 in the transverse direction 196.

The latching elements 192 simultaneously form front guide elements 246 in the form of front guide lugs 248 for example, the rear faces 250 thereof being oriented substantially parallel to the height direction 200 and substantially parallel to the transverse direction 196.

On a side thereof remote from the contact region 182, the connecting region 186 is adjoined by a terminal region 176 to which a preferably stripped end section 220 of the signal line 145 is fixed in electrically conductive manner, in particular, by a crimping process by means of crimping elements 222 which are formed on the terminal region 176.

At the end of the terminal region 176 remote from the connecting region 186, there follows in the longitudinal direction 180 a guidance region 276 which comprises two rear guide elements 254 in the form of rear guide lugs 256 for example which extend out from a central section 278 of the guidance region 276 in the transverse direction 196.

Preferably, the rear guide elements 254 are curved. The front end faces 280 of the rear guide elements 254 are preferably oriented substantially parallel to the height direction 200 and to the transverse direction 196 of the signal-line-system-side positioning element 168.

In this embodiment, the carrier-element-side positioning element 170 comprises two positioning projections 280 which extend in the longitudinal direction 208 of the carrier-element-side positioning element 170 and in the height direction 212 thereof and which are spaced from each other in the transverse direction 236.

Each positioning projection 280 ends at a front end wall 282 which extends in the transverse direction 236 and is provided at the front face thereof facing the respectively associated cell connector 116 or current termination 118 with a latching element 284 in the form of a latching nose 286 for example which limits the upward movement of the respectively associated latching element 192 of the signal-line-system-side positioning element 168 in the Z-direction 178 so that the signal-line-system-side positioning element 168 is held captive on the carrier-element-side positioning element 170.

A respective front guide rail 288 extends out forwardly in the longitudinal direction 208 from an end of each front end wall 282.

The front guide elements 246 of the signal-line-system-side positioning element 168 are guided laterally on the front guide rails 288 of the carrier-element-side positioning element 170 such as to be displaceable in the Z-direction 178 of the cell contacting system 100.

The spacing G between the front guide rails 288 in the transverse direction 236 of the carrier-element-side positioning element 170 corresponds to the width B of the signal-line-system-side positioning element 168 in the region of the front guide elements 246 so that the signal-line-system-side positioning element 168 is positioned along the transverse direction 196 in the desired manner by the carrier-element-side positioning element 170.

In this embodiment furthermore, the carrier-element-side positioning element 170 comprises two rear guide rails 290 which extend out from the positioning projections 280 towards one another in the region between the terminal region 176 and the rear guide elements 254 of the signal-line-system-side positioning element 168.

Hereby, the front end faces 258 of the rear guide elements 254 of the signal-line-system-side positioning element 168 abut on the rear faces 292 of the rear guide rails 292 remote from the front guide rails 288 so that the signal-line-system-side positioning element 168 is also positioned in the longitudinal direction 180 in the desired manner by means of the carrier-element-side positioning element 170 due to the cooperation of the front guide elements 246 and the rear guide elements 254 of the signal-line-system-side positioning element 168 with the front guide rails 288 and the rear guide rails 290 of the carrier-element-side positioning element 170.

In all other respects, the fourth embodiment of a signal-line-system-side positioning element 168 and a carrier-element-side positioning element 170 which is illustrated in FIGS. 14 to 16 corresponds in regard to the construction, functioning and method of production thereof with the third embodiment illustrated in FIGS. 11 to 13 and so to that extent reference should be made to the previous description thereof.

Figure 17:
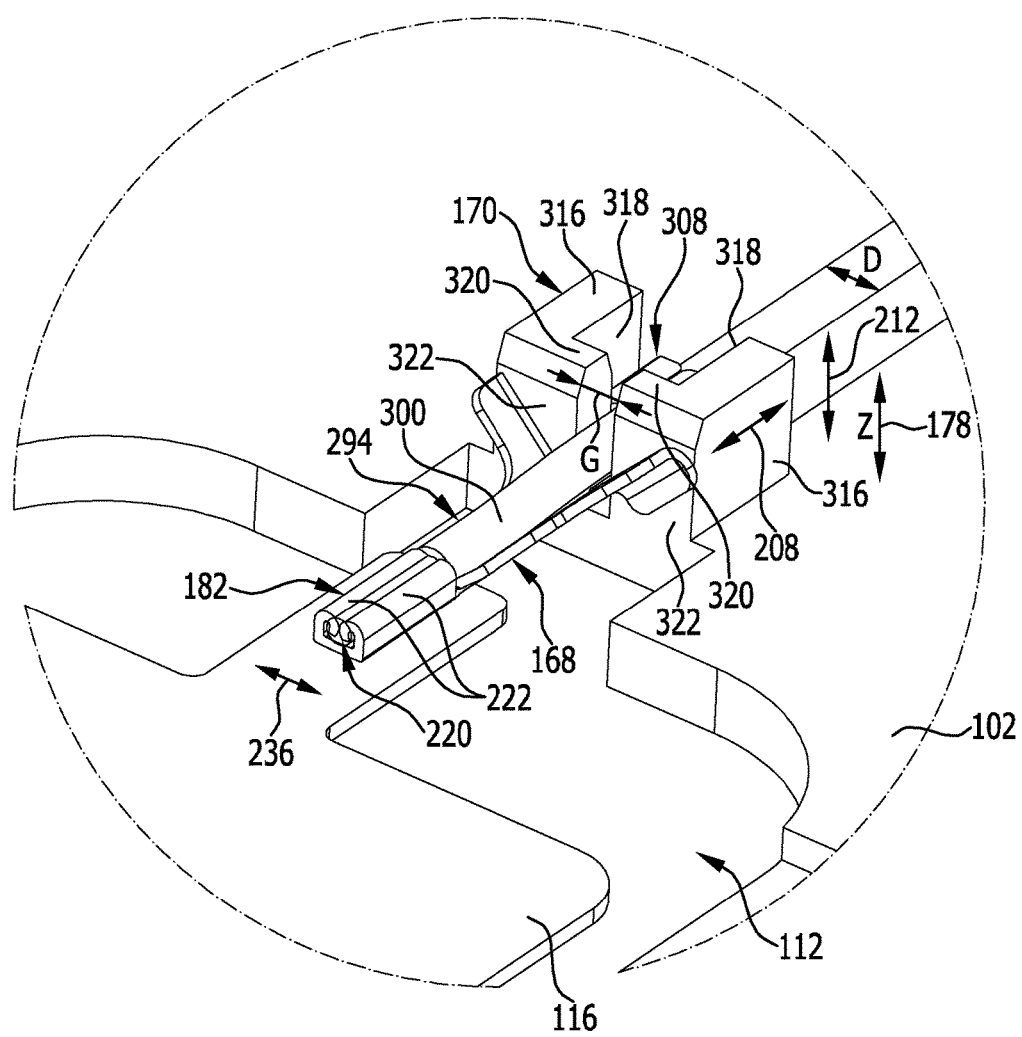
FIG. 17 an enlarged illustration of the region V depicted in FIG. 2.
Figure 18:
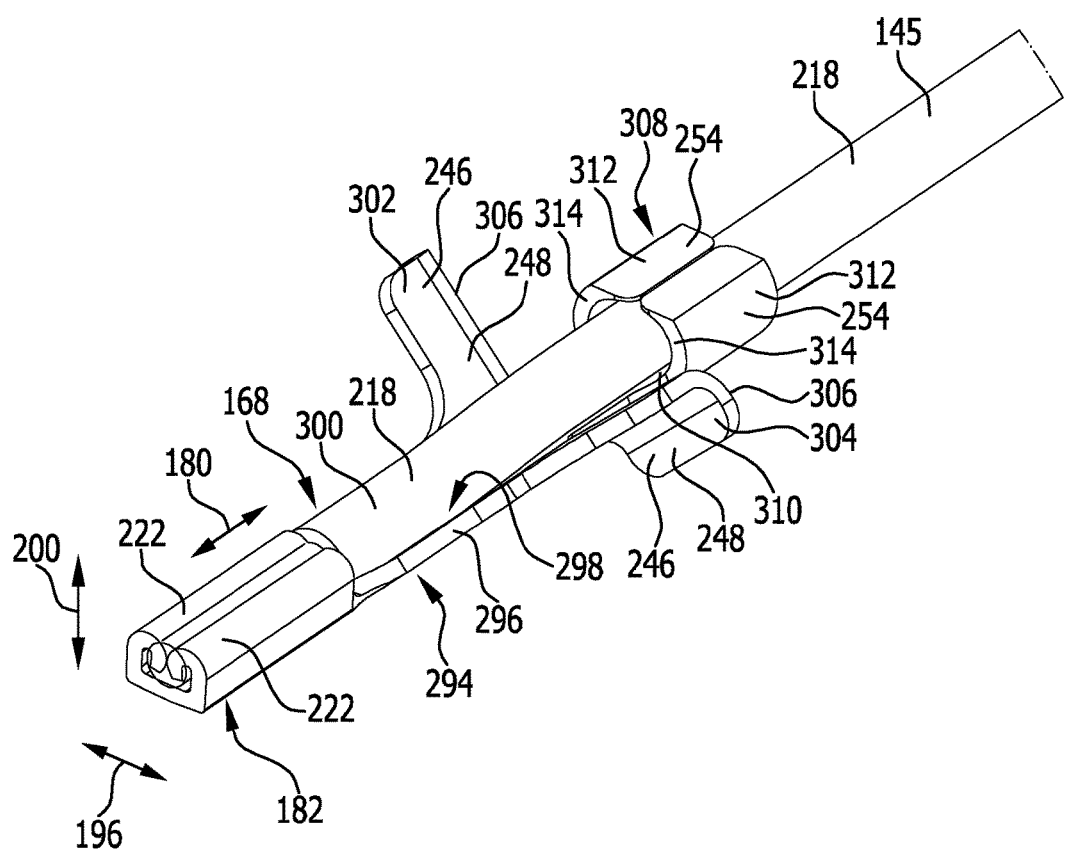
FIG. 18 a perspective illustration of the signal-line-system-side positioning element depicted in FIG. 17, without the carrier-element-side positioning element and without the carrier element.
Figure 19:
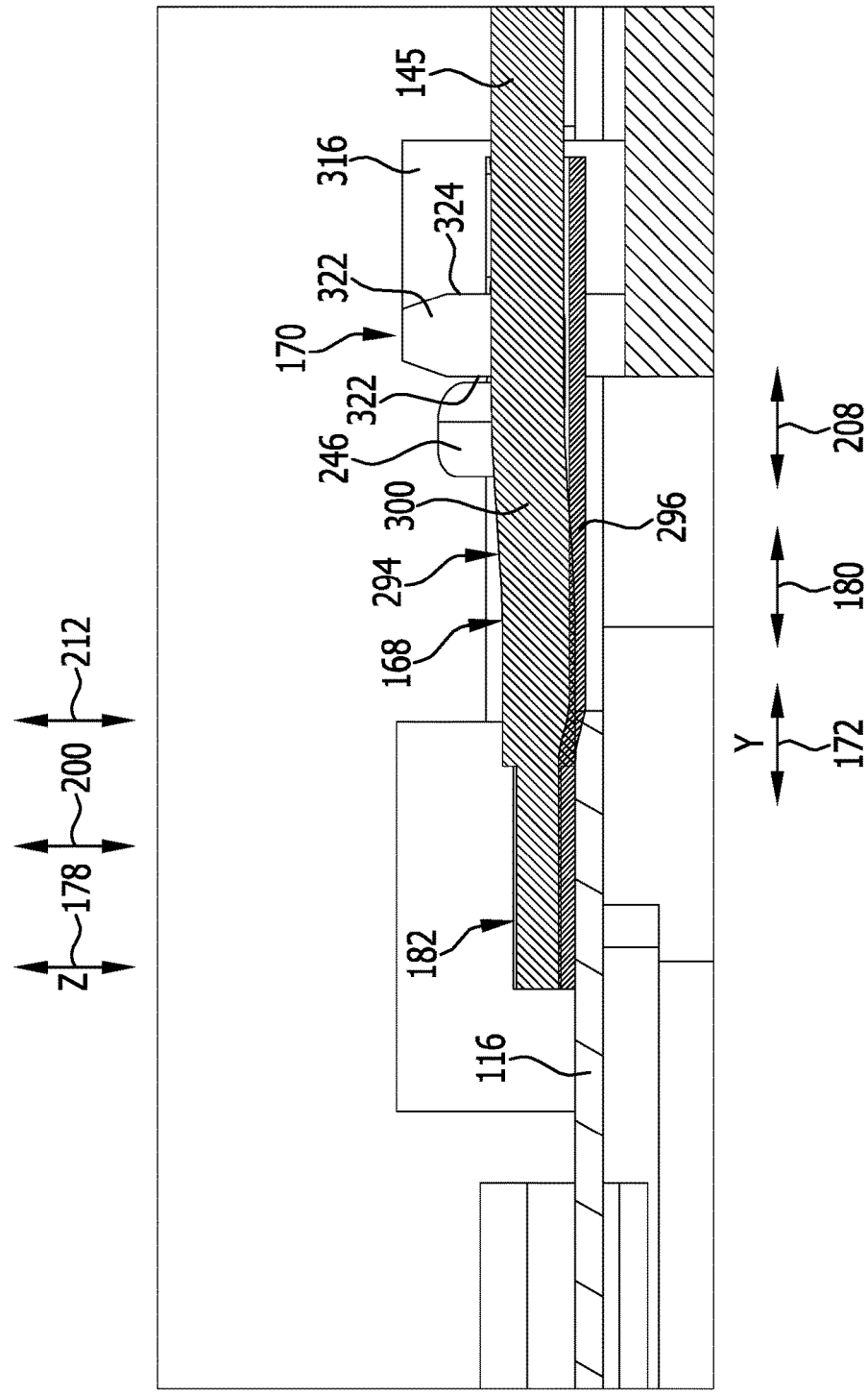
FIG. 19 a longitudinal section through the signal-line-system-side positioning element, the associated carrier-element-side positioning element and the associated cell connector depicted in FIG. 17, along the line 19-19 in FIG. 3.

A fifth embodiment of a signal-line-system-side positioning element 168 and an associated carrier-element-side positioning element 170 which is illustrated in FIGS. 17 to 19, differs from the previously described embodiments in that the end section 220 of the signal line 145 is not connected in electrically conductive manner to the signal-line-system-side positioning element 16 in a terminal region 176 that is spaced from the respectively associated cell connector 116 or current termination 118 in the assembled state of the cell contacting system 100, but rather, it is connected thereto in the contact region 182 of the signal-line-system-side positioning element 168.

For this purpose, the contact region 182 of the signal-line-system-side positioning element 168 in this embodiment comprises crimping elements 222 by means of which the (preferably stripped) end section 220 of the signal line 145 is fixable to the contact region 182 by a crimping process.

In this embodiment, the contact region 182 is connected by the end section 220 of the signal line 145 that is fixed thereto by the crimping process to the respectively associated cell connector 116 or current termination 118 in electrically conductive manner such as by welding and in particular by ultrasonic welding, laser welding or resistance welding, or by soldering for example.

In this embodiment of the signal-line-system-side positioning element 168, a rearward end of the contact region 182 is adjoined along the longitudinal direction 180 by a front guidance region 294 which comprises a central section 296 and front guide elements 248 in the form of front guide lugs 248 for example which project laterally therefrom.

The central section 296 is preferably curved concavely or is V-shaped in cross section (as taken along the transverse direction 196) and it thus forms a seating channel 298 in which a section 300 of the signal line 145 that is adjoined to the end section 220 and is preferably provided with an electrically insulating sheath 218 is at least partly accommodated.

In this embodiment, the front guide elements 246 are of an angled shape having a front section 302 which is inclined in relation to the height direction 200 and in relation to the transverse direction 196 and a rear section 304 which is oriented transversely and preferably substantially perpendicularly to the front section 302 whilst the rear face 306 thereof remote from the contact region 186 is oriented substantially parallel to the transverse direction 196 and to the height direction 200.

A rear guidance region 308 adjoins the rear end of the front guidance region 294 that is remote from the contact region 182.

The rear guidance region 308 comprises a central section 310 from which two crimping elements 312 project in a lateral direction, said crimping elements surrounding the signal line 145 in the form of an arc and enclosing it between them so that the section 300 of the signal line 145 that is provided with the electrically insulating sheath 218 is fixed by crimping (so-called iso-crimping) to the rear guidance region 308 of the signal-line-system-side positioning element 168.

The front end faces 314 of the crimping elements 312 are oriented substantially parallel to the height direction 200 and to the transverse direction 196.

In this embodiment, the carrier-element-side positioning element 170 illustrated in FIG. 17 comprises two positioning projections 316 which are spaced from each other in the transverse direction 236 of the carrier-element-side positioning element 170.

Guide rails 320 project from the mutually facing inner faces 318 of the positioning projections 316.

The spacing G between the free ends of the guide rails 320 along the transverse direction 236 of the carrier-element-side positioning element 170 corresponds to the diameter D of the section 300 of the signal line 145 that is provided with the electrically insulating sheath 218 so that the signal line 145 and the signal-line-system-side positioning element 168 affixed thereto are positioned in the desired manner along the transverse direction 196 by the carrier-element-side positioning element 170.

Furthermore, in the assembled state of the cell contacting system 100, the rear faces 306 of the front guide elements 246 of the signal-line-system-side positioning element 168 abut on the front faces 322 of the positioning projections 316 which face the respectively associated cell connector 116 or current termination 118 and the guide rails 320.

The front end faces 314 of the crimping elements 312 abut on the rear faces 324 (see FIG. 19) of the guide rails 320 that are remote from the front faces 322 of the guide rails 320.

The crimping elements 312 thus serve as rear guide elements 254 of the signal-line-system-side positioning element 168.

Due to the fact that the front guide elements 246 and the rear guide elements 254 of the signal-line-system-side positioning element 168 abut on the respective front faces 322 and rear faces 324 of the guide rails 320 of the carrier-element-side positioning element 170, the signal-line-system-side positioning element 168 is also positioned in the desired manner relative to the carrier-element-side positioning element 170 along the longitudinal direction 180.

Hereby, the signal-line-system-side positioning element 168 is simultaneously guided in the Z-direction 178 of the cell contacting system 100 on the carrier-element-side positioning element 170 in displaceable manner.

In all other respects, the fifth embodiment of a signal-line-system-side positioning element 168 and a carrier-element-side positioning element 170 which is illustrated in FIGS. 17 to 19 corresponds in regard to the construction, functioning and method of production thereof with the first embodiment illustrated in FIGS. 5 to 7 and so to that extent reference should be made to the previous description thereof.

Figure 20:
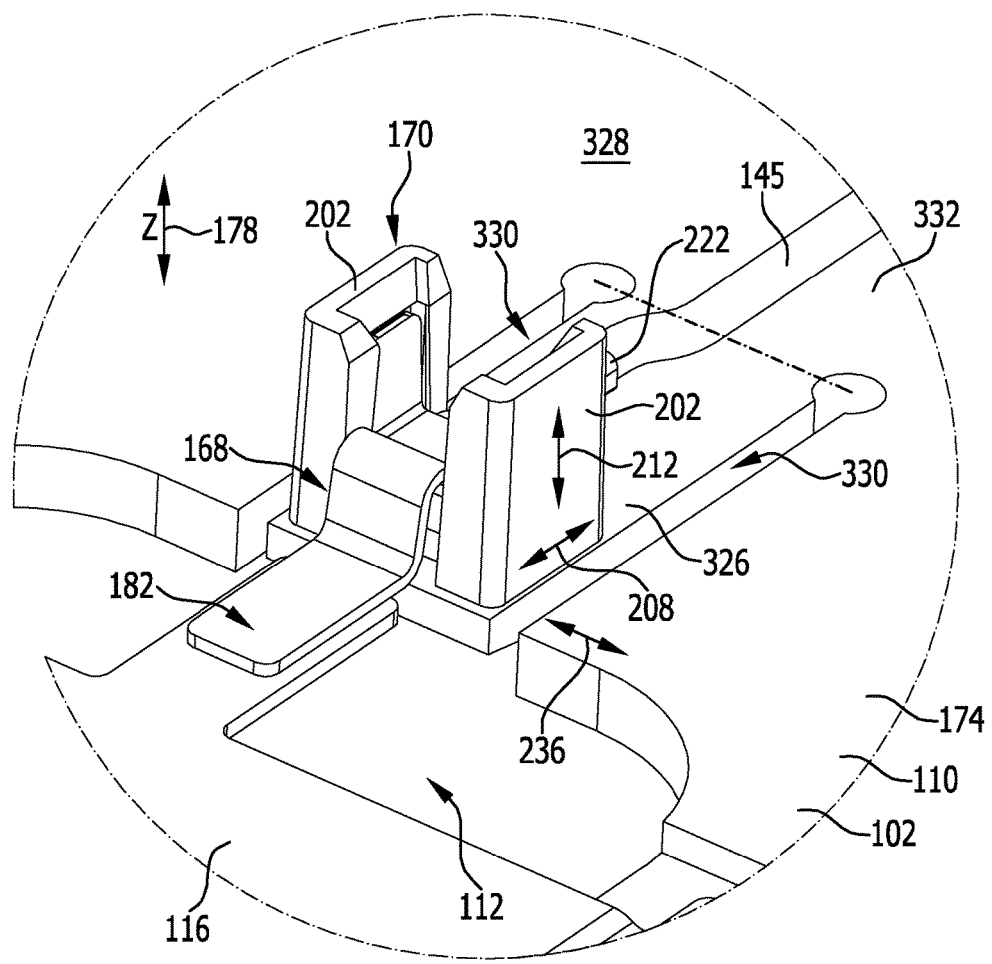
FIG. 20 an enlarged illustration of the region VI depicted in FIG. 2.

A sixth embodiment of a signal-line-system-side positioning element 168 and an associated carrier-element-side positioning element 170 which is illustrated in FIG. 20 differs from the first embodiment illustrated in FIGS. 5 to 7 in that the carrier-element-side positioning element 170 is arranged on a carrier section 326 which is connected to a base body 328 of the carrier element 102 that carries the respectively associated cell connector 116 or current termination 118 in such a way that the carrier section 326 together with the carrier-element-side positioning element 170 that is arranged thereon is movable relative to the base body 328 of the carrier element 102 in the Z-direction 178 of the cell contacting system 100.

In particular, provision may be made for the carrier section 326 to be separated from the base body 328 by recesses 330—which preferably run in the longitudinal direction 208 of the carrier-element-side positioning element 170—on two mutually opposite sides of the carrier section 326 and to be connected (preferably in one piece manner) to the base body 328 at only one side so that the carrier section 326 is pivotal relative to the base body 328 (preferably resiliently) about the connecting line 332 between the end points of the recesses 330, wherein this pivotal movement exhibits a component in the Z-direction 178.

Thus, independently of the deformability of the deformation region 184 of the signal-line-system-side positioning element 168, the possibility is thereby provided for the contact region 182 to move relative to the base body 328 of the carrier element 102 along the Z-direction 178 and hence compensate for tolerances.

Consequently, the deformation region 184 of the signal-line-system-side positioning element 168 could also be dispensed with in this embodiment.

In all other respects, the sixth embodiment of a signal-line-system-side positioning element 168 and a carrier-element-side positioning element 170 which is illustrated in FIG. 20 corresponds in regard to the construction, functioning and method of production thereof with the first embodi-

The invention claimed is:

1. A cell contacting system for an electro-chemical device which comprises a plurality of electro-chemical cells and a current line system, wherein the cell contacting system comprises
a signal line system having one or more signal lines for connecting a respective signal source to a signal line termination or to a monitoring device of the cell contacting system in electrically conductive manner and
a carrier element which carries the signal line system,
wherein the cell contacting system comprises at least one signal-line-system-side positioning element which is fixed to a signal line of the signal line system, and at least one carrier-element-side positioning element which is fixed at least temporarily to the carrier element,
wherein the signal-line-system-side positioning element is connected at least temporarily to the carrier-element-side positioning element in such a way that the signal-line-system-side positioning element is positioned in a desired position relative to a cell connector or a current termination of the current line system,
wherein the cell connectors are arranged over the cell terminals of the electro-chemical cells that are to be connected to one another in a Z-direction in the assembled state of the cell contacting system,
wherein the signal-line-system-side positioning element comprises a contact region by means of which the signal-line-system-side positioning element is fixed to the associated cell connector or current termination,
a terminal region by means of which the signal-line-system-side positioning element is fixed to the associated signal line, and
a deformation region which is arranged between the contact region and the terminal region, and
wherein the deformation region is deformable in such a way that the contact region of the signal-line-system-side positioning element is movable relative to the terminal region along the Z-direction.

2. The cell contacting system in accordance with claim 1, wherein the signal-line-system-side positioning element is formed of an electrically conductive material.

3. The cell contacting system in accordance with claim 1, wherein the signal-line-system-side positioning element is connected in electrically conductive manner to the associated signal line and to the associated cell connector or current termination.

4. The cell contacting system in accordance with claim 1, wherein the signal-line-system-side positioning element is fixed to the associated cell connector or current termination by welding, soldering, crimping, riveting and/or a screw connection.

5. The cell contacting system in accordance with claim 1, wherein the signal-line-system-side positioning element is fixed to the associated signal line by welding, soldering, crimping, insulation-crimping and/or riveting.

6. The cell contacting system in accordance with claim 1, wherein the signal line comprises a plurality of individual conductors.

7. The cell contacting system in accordance with claim 1, wherein the signal line associated with the signal-line-system-side positioning element is fixed to a terminal region of the signal-line-system-side positioning element which is spaced from the associated cell connector or current termination.

8. The cell contacting system in accordance with claim 1, wherein the signal line associated with the signal-line-system-side positioning element is fixed to a contact region of the signal-line-system-side positioning element which abuts on the associated cell connector or current termination.

9. The cell contacting system in accordance claim 1, wherein the carrier-element-side positioning element is formed from an electrically insulating material.

10. The cell contacting system in accordance with claim 1, wherein the carrier-element-side positioning element is formed in one piece with the carrier element.

11. The cell contacting system in accordance with claim 1, wherein the signal-line-system-side positioning element is connected to the carrier-element-side positioning element at least temporarily by latching, caulking and/or clamping.

12. The cell contacting system in accordance with claim 1, wherein the cell connectors are arranged next to each other in an X-direction and/or in a Y-direction of the cell contacting system,
wherein the X-direction, the Y-direction and the Z-direction are oriented perpendicularly to each other in pairs.

13. The cell contacting system in accordance with claim 12, wherein a contact region of the signal-line-system-side positioning element, by means of which the signal-line-system-side positioning element is fixed to the associated cell connector or current termination, is held on the carrier-element-side positioning element such as to be displaceable relative to the carrier-element-side positioning element along the Z-direction.

14. The cell contacting system in accordance with claim 1, wherein the carrier-element-side positioning element is arranged on a carrier section of the carrier element, wherein the carrier section is connected to a base body of the carrier element in such a way that the carrier section together with the carrier-element-side positioning element is movable relative to the base body of the carrier element along the Z-direction.

15. The cell contacting system in accordance with claim 1, wherein the current line system is a component of the cell contacting system and in that the carrier element carries the current line system.

16. The cell contacting system in accordance with claim 1, wherein the signal-line-system-side positioning element is fixed to the associated cell connector or current termination.

17. An electro-chemical device, comprising a plurality of electro-chemical cells and a cell contacting system which comprises
a signal line system having one or more signal lines for connecting a respective signal source to a signal line termination or to a monitoring device of the cell contacting system in electrically conductive manner and
a carrier element which carries the signal line system,
wherein the cell contacting system comprises at least one signal-line-system-side positioning element which is fixed to a signal line of the signal line system, and at least one carrier-element-side positioning element which is fixed at least temporarily to the carrier element,
wherein the signal-line-system-side positioning element is connected at least temporarily to the carrier-element-side positioning element in such a way that the signal-line-system-side positioning element is positioned in a desired position relative to a cell connector or a current termination of the current line system, wherein the cell connectors are arranged over the cell terminals of the electro-chemical cells that are to be connected to one another in a Z-direction in the assembled state of the cell contacting system, wherein the signal-line-system-side positioning element comprises a contact region by means of which the signal-line-system-side positioning element is fixed to the associated cell connector or current termination, a terminal region by means of which the signal-line-system-side positioning element is fixed to the associated signal line, and a deformation region which is arranged between the contact region and the terminal region, and wherein the deformation region is deformable in such a way that the contact region of the signal-line-system-side positioning element is movable relative to the terminal region along the Z-direction.

18. The electro-chemical device in accordance with claim 17, wherein the signal-line-system-side positioning element is fixed to the associated cell connector or current termination.

19. A method of manufacturing a cell contacting system for an electro-chemical device which comprises a plurality of electro-chemical cells and a current line system, comprising the following:

producing a signal line system having one or more signal lines for connecting a respective signal source to a signal line termination or a monitoring device of the cell contacting system in electrically conductive manner;

fixing a signal line of the signal line system to a signal-line-system-side positioning element;

connecting the signal-line-system-side positioning element to a carrier-element-side positioning element which is fixed to the carrier element so that the signal-line-system-side positioning element is positioned in a desired position relative to a cell connector or a current termination of the current line system;

fixing the signal-line-system-side positioning element to the associated cell connector or current termination;

wherein the signal line system is carried by a carrier element of the cell contacting system in the assembled state of the cell contacting system, wherein the cell connectors are arranged over the cell terminals of the electro-chemical cells that are to be connected to one another in a Z-direction in the assembled state of the cell contacting system, wherein the signal-line-system-side positioning element comprises a contact region by means of which the signal-line-system-side positioning element is fixed to the associated cell connector or current termination, a terminal region by means of which the signal-line-system-side positioning element is fixed to the associated signal line, and a deformation region which is arranged between the contact region and the terminal region, and wherein the deformation region is deformable in such a way that the contact region of the signal-line-system-side positioning element is movable relative to the terminal region along the Z-direction.

20. The method in accordance with claim 19, wherein the carrier-element-side positioning element is released from the carrier element and/or from the signal-line-system-side positioning element after the process of fixing the signal-line-system-side positioning element to the cell connector or the current termination.

* * * * *